(12) United States Patent
Miyamori

(10) Patent No.: US 6,233,079 B1
(45) Date of Patent: *May 15, 2001

(54) LIGHT-SIGNAL TRANSMITTING APPARATUS, LIGHT-SIGNAL RECEIVING APPARATUS, LIGHT-SIGNAL TRANSFER APPARATUS AND LIGHT-SIGNAL TRANSFER METHOD

(75) Inventor: Shinji Miyamori, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/493,785

(22) Filed: Jan. 28, 2000

Related U.S. Application Data

(62) Division of application No. 08/958,597, filed on Oct. 29, 1997.

(30) Foreign Application Priority Data

Oct. 31, 1996 (JP) .................................................. 8-290563

(51) Int. Cl.[7] .................................................. H04B 10/04
(52) U.S. Cl. .......................... 359/180; 359/154; 359/172; 369/13; 369/14; 369/32; 386/91; 386/98; 386/42
(58) Field of Search .................................... 359/180, 154, 359/172, 174; 369/13–14, 32, 275–1; 381/172; 386/42, 45, 82, 91, 98, 128

(56) References Cited

U.S. PATENT DOCUMENTS

| | | | |
|---|---|---|---|
| 4,992,754 | 2/1991 | Blauvelt et al. | 330/149 |
| 5,436,749 | 7/1995 | Pidgeon, Jr. et al. | 359/161 |
| 5,448,392 | 9/1995 | Pophillat | 359/161 |
| 5,771,331 * | 6/1998 | Aoki et al. | 386/91 |
| 5,796,695 * | 8/1998 | Tsutsui | 369/32 |
| 6,025,946 * | 2/2000 | Miyamori et al. | 359/154 |

OTHER PUBLICATIONS

International Standard, ISO/IEC 13818–2, First Edition May 15, 1996, Information Technology–Generic Coding of Moving Pictures and Associated Audio Information: Video.

International Standard, ISO/IEC 13818–3, Second Edition Apr. 15, 1998, Information Technology–Generic Coding of Moving Pictures and Associated Audio Information–Part 3: Audio.

* cited by examiner

*Primary Examiner*—Kinfe-Michael Negash
(74) *Attorney, Agent, or Firm*—Sonnenschein Nath & Rosenthal

(57) ABSTRACT

A light-signal transfer apparatus capable of continuously reproducing signals even if the transfer passage is temporarily intercepted, the apparatus being structured in such a manner that a delay memory delays time-sequential digital data to generate digital data, a multiplexer multiplexes two digital data items to transfer the data items as infrared rays. An error correction circuit corrects the transmitted signals to output multiplexed data and outputs error detection signal indicating a fact that correction cannot be performed because of interception of the transfer passage or the like. A demultiplexer separates transmitted multiplexed data into two digital data items, and a delay memory delays one of the digital data items to make coincide the time bases of the two data items. A data selector selects either of the two digital data items in accordance with information of the error detection signal.

2 Claims, 17 Drawing Sheets

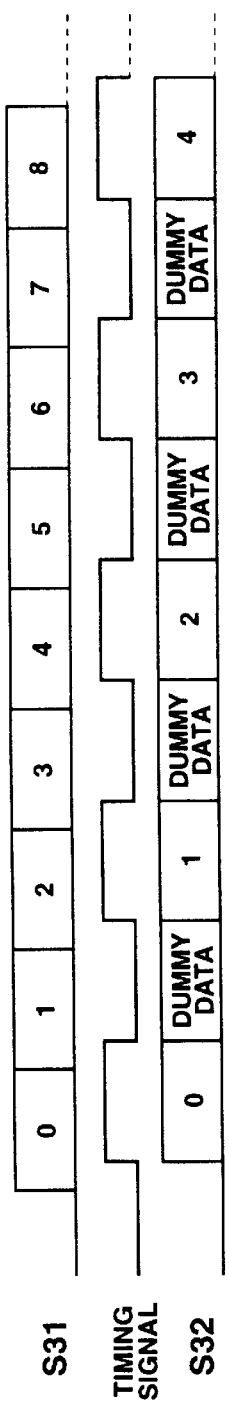
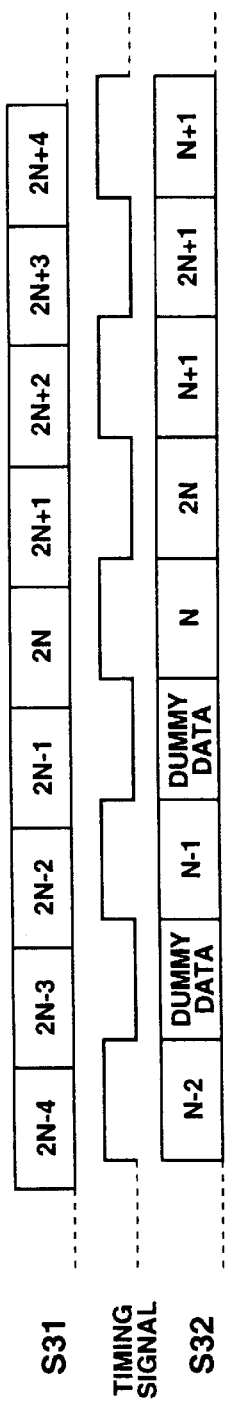
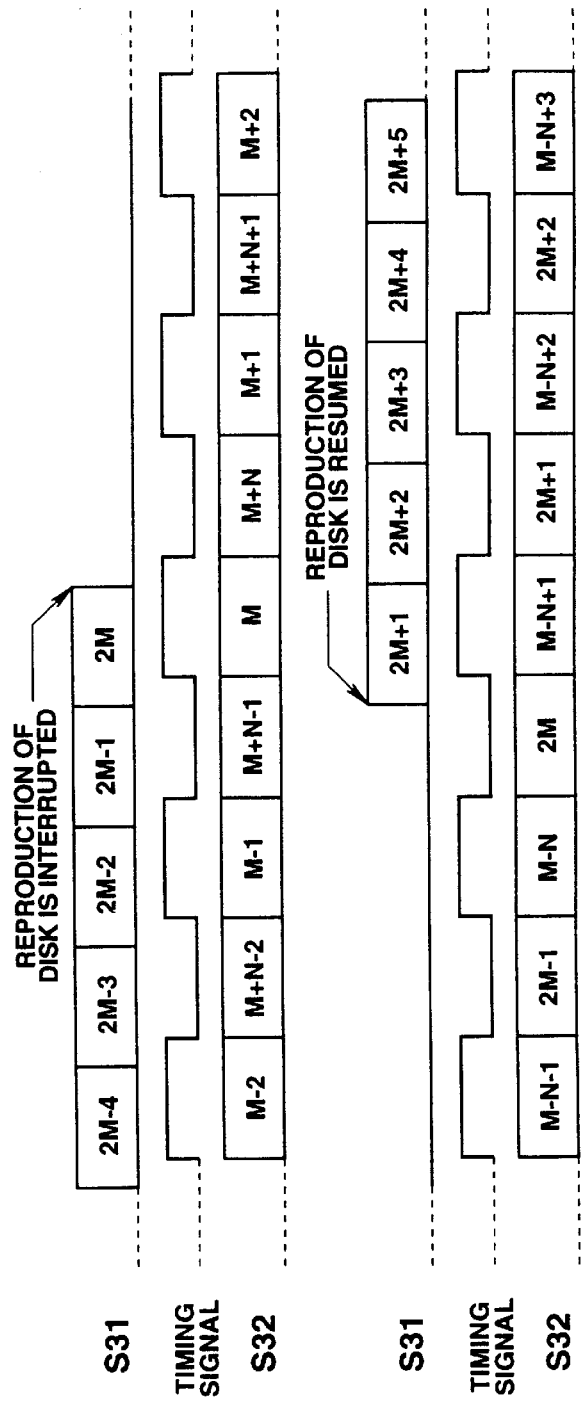
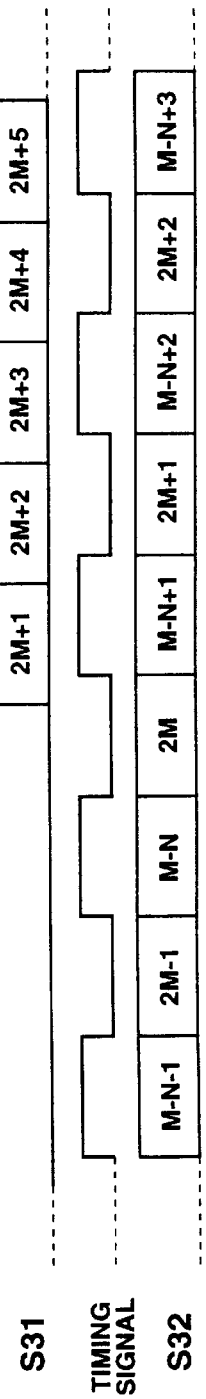

LIGHT-SIGNAL TRANSMITTING APPARATUS, LIGHT-SIGNAL RECEIVING APPARATUS, LIGHT-SIGNAL TRANSFER APPARATUS AND LIGHT-SIGNAL TRANSFER METHOD

This is a divisional of application Ser. No. 08/958,597, filed Oct. 29, 1997.

BACKGROUND OF THE INVENTION

1. Field of the Invention

The present invention relates to a signal transfer apparatus, and more particularly to a light-signal transmitting apparatus, a light-signal receiving apparatus, a light-signal transfer apparatus and a light-signal transfer method with which a signal reproduced by audio equipment of video equipment is emitted to a space as a light signal, such as an infrared ray to transfer the signal to the other audio equipment or the video equipment.

2. Related Art of the Invention

Audio equipment, such as a digital audio disk reproducing apparatus, is sometimes provided with a light-signal transfer apparatus using, for example, an infrared ray to permit a user to easily operate the apparatus. The light-signal transfer apparatus, which is provided for the audio equipment, has a light emitting diode arranged to be operated in response to an audio signal to emit, to a space, an infrared ray having an intensity corresponding to the level of the audio signal. The emitted infrared ray is transferred to a receiving apparatus. The receiving apparatus having a light receiving device arranged to receive the infrared ray to demodulate the audio signal so as to reproduce the audio signal through a loud speaker unit, earphone or the like.

However, the light-signal transfer apparatus using the infrared ray must be structured as shown in FIG. 1 in such a manner that a light signal S1 is directly emitted from a light emitting portion 1 to a light receiving portion 2. That is, the transfer passage for the infrared ray arranged to be transferred through a space must be formed into a linear shape using a direct light beam. It leads to a fact that the transfer passage is intercepted if an obstacle 3, such as a human being, exists between the light emitting portion 1 and the light receiving portion 2, as shown in FIG. 2. Therefore, the light signal S1 is blocked attributable to the interception of the transfer passage, thus causing a problem to arise in that the audio signal cannot be transferred.

In view of the foregoing, an object of the present invention is to provide a light-signal transmitting apparatus, a light-signal receiving apparatus, a light-signal transfer apparatus and a light-signal transfer method each of which is capable of continuously reproducing signals even if the transfer passage is temporarily intercepted.

SUMMARY OF THE INVENTION

To achieve the above-mentioned problems, a light-signal transmitting apparatus according to the present invention includes: dividing means for dividing a supplied signal into first and second transfer signals having the same contents as those of the supplied signal; delay means for delaying the second transfer signal by a predetermined time; and transmitting means for converting the first transfer signal and the second transfer signal delayed by the delay means into light signals and emitting the light signals into a space.

The light-signal transmitting apparatus divides the supplied signal into the two same signals to delay either of the two signals and converts the two signals into light signals to be transferred.

A light-signal transmitting apparatus according to the present invention includes: reproducing means for reproducing data recorded on a recording medium; storage means for temporarily storing data reproduced by the reproducing means; write control means for controlling the reproducing means to administrate data stored on the storage means; a first reading portion for reading data stored on the storage means; a second reading portion for reading, from data read from the first reading portion, data stored on the storage means preceding to data read from the first reading portion; read control means for generating a transfer signal obtained by multiplexing two data items read from the first reading portion and the second reading portion; and transmitting means for converting the transfer signal into a light signal and emitting the light signal to the space.

The light-signal transmitting apparatus according to the present invention is arranged to temporarily store data reproduced from the recording medium on the storage means. The light-signal transmitting apparatus multiplexes data usually read from the storage means and data read prior to data read usually to convert the multiplexed signal into a light signal so as to transfer the light signal.

A light-signal receiving apparatus according to the present invention includes: receiving means for receiving a first light signal emitted to a space and a second light signal having the same transfer contents as those of the first light signal and emitted to the space after a predetermined time has elapsed and converting the first and second light signals into a first transfer signal and a second transfer signal having the same transfer contents as those of the first transfer signal and delayed by a predetermined time, the first and second transfer signals corresponding to the first and second light signals; delay means for making coincide the time base of the second transfer signal and that of the transfer contents by delaying the first transfer signal by a predetermined time; and signal selection means for selecting the first transfer signal or the second transfer signal in accordance with the quality of the first transfer signal delayed by the delay means by the predetermined time and that of the second transfer signal.

The light-signal receiving apparatus according to the present invention receives a signal obtained by dividing a supplied signal into two same signals, by delaying either of the two signals, by converting the two signals into light signals and by transferring the light signals to select either of the two signals having superior quality.

A light-signal transfer apparatus according to the present invention includes: a light-signal transmitting apparatus having transmission-signal dividing means for dividing a supplied signal into first and second transfer signals each having the same contents as those of the supplied signal; transmission-signal delay means for delaying the second transfer signal by a predetermined time; transmitting means for converting the first transfer signal and the second transfer signal delayed by the delay means into light signals to emit the light signals into a space; and a light-signal receiving apparatus having receiving means for receiving the light signals emitted to the space from the light-signal transmitting apparatus to reproduce the first and second transfer signals; received-signal delay means for making coincide the time base of the second transfer signal and that of the transfer contents by delaying the first transfer signal by a predetermined time; and signal selection means for selecting the first transfer signal or the second transfer signal in accordance with the quality of the first transfer signal delayed by the received-signal delay means by the predetermined time and that of the second transfer signal.

The light-signal transfer apparatus according to the present invention has the light-signal transmitting apparatus which divides a supplied signal into two same signals and delays either of the two signals to convert the signals into light signals. The light-signal receiving apparatus receives the signals to select either of the two signals having superior quality.

A light-signal transfer apparatus according to the present invention includes: a light-signal transmitting apparatus having order exchanging means arranged to be supplied with time sequential signals composed of units formed by sectioning data into predetermined time regions and structured to generate a transfer signal subjected to an interleaving process with which the time sequential order of the units of the time sequential signals is exchanged and a light-signal transmitting apparatus for converting the transfer signal into a light signal to emit the light signal to a space; a light-signal receiving apparatus having receiving means for receiving the light signal emitted to the space from the light-signal transmitting apparatus to reproduce the transfer signal; means for again exchanging the order for subjecting the transfer signals to a deinterleaving process with which the order of the units of the transfer signals is exchanged to the original time sequential order; and interpolating means for interpolating data of the transfer signal, the order of which has been exchanged by the means for again exchanging the order, and which has inferior quality in accordance with data of units prior to and subsequent to the unit including data having inferior quality.

The light-signal transfer apparatus has the light-signal transmitting apparatus for subjecting the supplied time-sequential signals to the interleaving process to convert the signals into light signals to be transmitted. The light-signal receiving apparatus receives the light signals and subjects the signals to the deinterleaving process to interpolate data having inferior quality.

A light-signal transferring method according to the present invention includes the steps of: dividing a supplied signal into first and second transfer signals each having the same contents as those of the supplied signal; delaying the second transfer signal by a predetermined time; converting the first transfer signal and the second transfer signal delayed by a predetermined time from the first transfer signal into light signals to emit the light signals to a space; receiving the light signals emitted to the space to reproduce the first and second transfer signals; making coincide the time base of the second transfer signal and that of the transfer contents by delaying the reproduced first transfer signal by a predetermined time; and selecting the first transfer signal or the second transfer signal in accordance with the quality of the first transfer signal and the second transfer signal delayed by the predetermined time.

A light-signal transferring method according to the present invention includes the steps of: generating transfer signals subjected to an interleaving process with which the time sequential order of units of time sequential signals composed of units formed by sectioning data into predetermined time regions is exchanged; converting the transfer signals into light signals to emit the light signals to a space; receiving the light signals emitted to the space to reproduce the transfer signals; subjecting the transfer signals to a deinterleaving process for exchanging the time sequential order of the units of the transfer signals; and interpolating data of the transfer signal, the order of which has been exchanged and which has inferior quality, in accordance with data of units prior to and subsequent to the unit including data having inferior quality.

BRIEF DESCRIPTION OF THE DRAWINGS

FIGS. 10A to 10D are timing charts of the operation for writing/reading data to and from a memory of the light-signal transmitting apparatus;

DETAILED DESCRIPTION OF THE PREFERRED EMBODIMENTS

Embodiments of the present invention will now be described with reference to the drawings.

Figure 1:
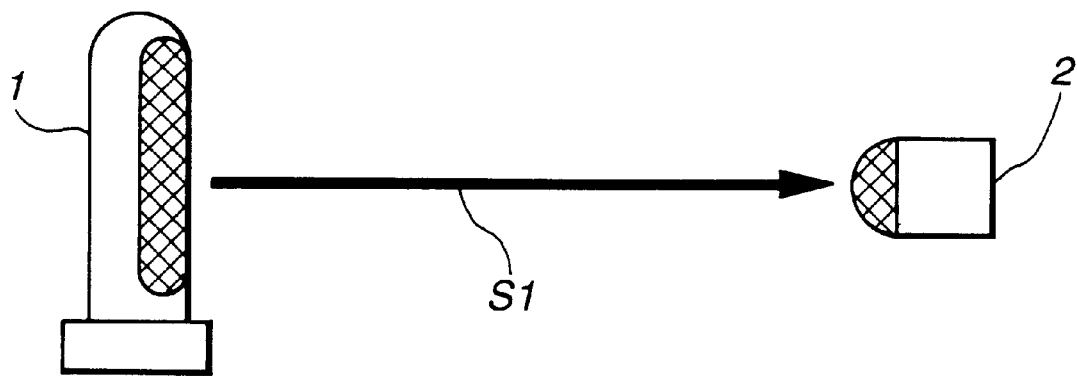
FIG. 1 is a diagram showing a transfer passage for use when a conventional optical spatial communication is performed.
Figure 2:
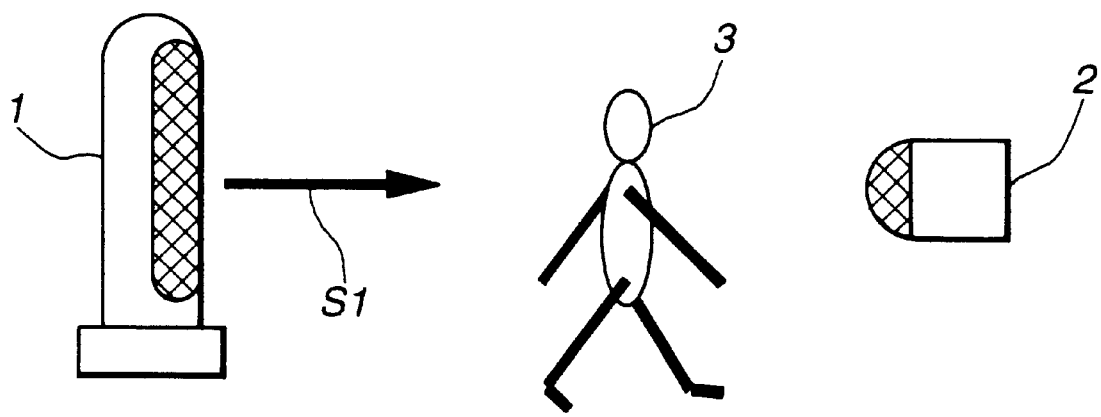
FIG. 2 is a diagram showing the transfer passage for use when the conventional optical spatial communication is performed.
Figure 3:
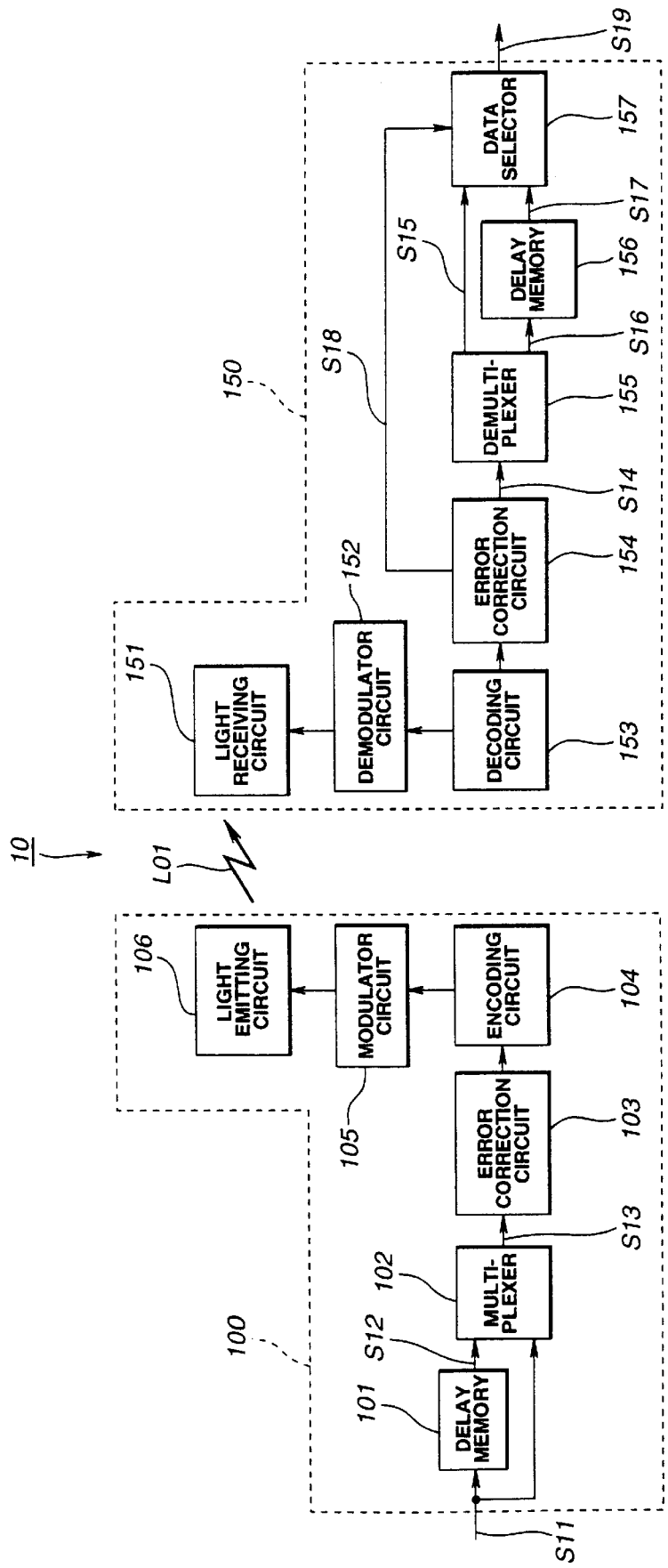
FIG. 3 is a block diagram showing a light-signal transfer system according to a first embodiment of the present invention.

A first embodiment of a light-signal transfer system according to the present invention will now be described. A light-signal transfer system 10, as shown in FIG. 3, composed of a light-signal transmitting apparatus 100 and a light-signal receiving apparatus 150.

The light-signal transmitting apparatus 100 has a delay memory 101, a multiplexer 102, an error correction circuit 103, an encoding circuit 104, a modulator circuit 105 and a light emitting circuit 106.

Digital data S11 is supplied to the light-signal transmitting apparatus 100. Digital data S11 is a time-sequential digital signal, for example, a digital audio signal or a digital video signal. Digital data S11 is supplied to the delay memory 101 and the multiplexer 102.

The delay memory 101 delays supplied digital data S11 by a predetermined quantity of delay to generate digital data S12 so as to supply digital data S12 to the multiplexer 102.

The multiplexer 102 multiplexes supplied digital data S11 and digital data S12 to generate multiplexed data S13 so as to supply multiplexed data S13 to the error correction circuit 103. Note that the operations of the delay memory 101 and the multiplexer 102 will be described later.

The error correction circuit 103 divides supplied multiplexed data S13 into a predetermined blocks, and then adds an error correction code to multiplexed data S13 divided into each block to supply digital signals, to each of which the error correction code has been added, to the encoding circuit 104.

The encoding circuit 104 subjects, the digital signal to which the error correction code has been added, to an interleaving process in block units, and then adds a header, synchronizing data and the like. Then, the encoding circuit 104 subjects the digital signal to an encoding process using an encoding method adaptable to transfer. The digital signal processed as described above is supplied from the encoding circuit 104 to the modulator circuit 105.

The modulator circuit 105 modulates the digital signal supplied from the encoding circuit 104 by a predetermined modulating method so as to output a transfer signal adaptable to light spatial transfer. As the modulating method, for example DQPSK (Differential Quadrature Phase Shift Keying) using a carrier wave having a frequency of 4.5 MHZ is employed. The modulated digital signal is formed into a transfer signal having a frequency band from 3 MHZ to 6 MHZ.

The light emitting circuit 106 includes an optical device for emitting an infrared ray and a diffuser. As the optical device, an LED (Light Emitting Diode), a laser diode or the like is employed. The light emitting circuit 106 emits infrared ray L01 to a space when the transfer signal operates the optical device or the like of the light emitting circuit 106.

The infrared ray L01 emitted from the light emitting circuit 106 to the space is supplied to the light-signal receiving apparatus 150.

The light-signal receiving apparatus 150 includes a light receiving circuit 151, a demodulator circuit 152, a decoding circuit 153, an error correction circuit 154, a demultiplexer 155, a delay memory 156 and a data selector 157.

The light receiving circuit 151 includes a photoelectric transfer device, a lens and the like. The light receiving circuit 151 receives infrared ray L01 to generate a light receipt signal having a level which is changed in accordance with the quantity of the infrared ray L01. As a result, the light receiving circuit 151 receives the transfer signal and corrects the level of the transfer signal by an automatic gain control circuit (not shown) thereof to supply the corrected transfer signal to the demodulator circuit 152.

The demodulator circuit 152 reproduces a carrier wave from the transfer signal output from the light receiving circuit 151 to demodulate the digital signal from the carrier wave by a demodulating method corresponding to the modulator circuit 105. The demodulator circuit 152 supplies the demodulated digital signal to the decoding circuit 153.

The decoding circuit 153 detects, from the digital signal, synchronizing data, the header and the like to decode the digital signal by a decoding method corresponding to the encoding circuit 104 relative to a result of the detection. Then, the decoding circuit 153 subjects a result of the decoding operation to a deinterleaving process to supply, to the error correction circuit 154, the digital signal to which the error correction code has been added.

The error correction circuit 154 uses the error correction code of the digital signal to correct an error of the digital signal so as to correct a bit error generated in the spatial transfer performed in a region from the light-signal transmitting apparatus 100 to the light-signal receiving apparatus 150. Thus, the error correction circuit 154 outputs multiplexed data S14 of the digital signal having a quality restored from the state of the quality lost during the transfer. Multiplexed data S14 is a signal corresponding to multiplexed data S13 obtained by multiplexing digital data S11 and digital data S12. Moreover, the error correction circuit 154 supplies, to the data selector 157, error detection signal S18 indicating whether or not an error has been detected and whether or not the error can be corrected.

The demultiplexer 155 separates multiplexed data S14 into digital data S15 and digital data S16. The demultiplexer 155 supplies separated digital data S15 to the data selector 157 and supplies digital data S16 to the delay memory 156. Note that digital data S15 corresponds to digital data S12 and digital data S16 correspond to digital data S11.

The delay memory 156 delays supplied digital data S16 by a quantity which is the same as the quantity of delay realized by the delay memory 101 to generate digital data S17. As a result of the above-mentioned process, the time base of digital data S17 coincides with the time base of the digital data S15.

In accordance with information indicated by an error detection signal S18, the data selector 157 selects digital data S15 or digital data S17. The data selector 157 outputs selected digital data S15 or digital data S17 as digital data S19. That is, when the error detection signal S18 indicates that no portion having an error which cannot be corrected exists, the data selector 157 selects digital data S15 and outputs digital data S15 as digital data S19. When the error detection signal S18 indicates that a portion having an error which cannot be corrected exists, the data selector 157 selects digital data S17 to output digital data S17 as digital data S19. The operations of the demultiplexer 155, the delay memory 156 and the data selector 157 will be described later.

Figure 4:
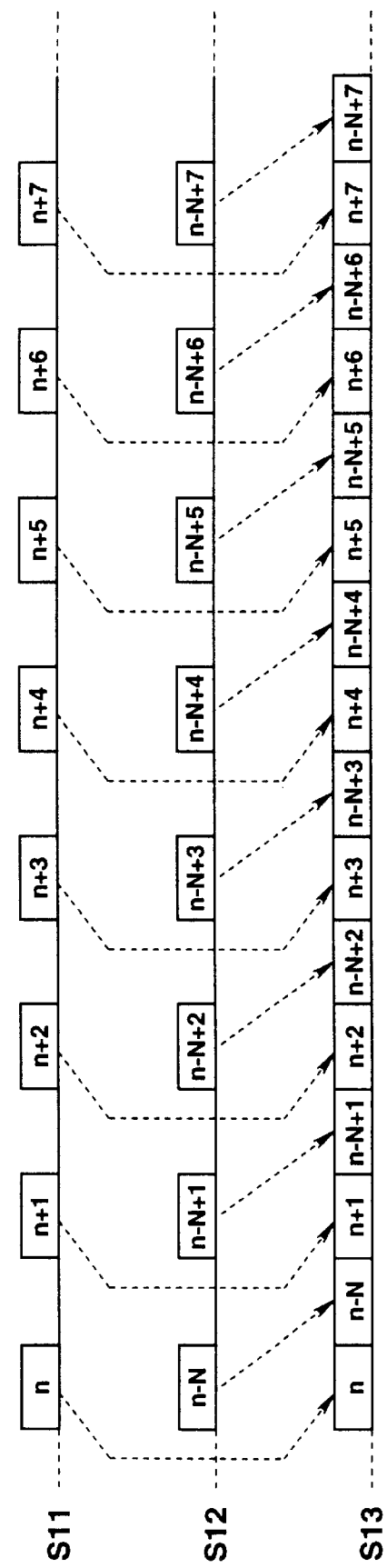
FIG. 4 is a timing chart of the operations of a delay memory and a multiplexer of the light-signal transmitting apparatus.

The operations of the delay memory 101 and the multiplexer 102 of the light-signal transmitting apparatus 100 will now be described with reference to FIG. 4.

Digital data S11 is formed in such a manner that data is sectioned into predetermined time units. The size of the unit, which is different depending upon the type of the signal, may be one frame unit or one field unit in a case of a digital video signal. In a case of a digital audio signal, an integer multiple (for example, 1,024 times) of the sampling period of the signal may be employed. The units are given number 0, 1, 2, 3, ..., n, ... in the time sequential order. Note that unit 0 indicates a leading unit of digital data S11. Referring to FIG. 4, digital data S11 has units numbered from n to n+7.

Digital data S12 is obtained by delaying digital data S11 by a predetermined quantity of delay, that is, N units by the delay memory 101. When the delay memory 101 is supplied with digital data S11 composed of units having numbers n, n+1, n+2, ..., the delay memory 101 output digital data S12 composed of units having numbers n−N, n−N+1, n−N+2, ....

Multiplexed data S13 is formed by alternately multiplexing digital data S11 and digital data S12 in each unit. When the multiplexer 102 is supplied with digital data S11 composed of units having numbers n, n+1, n+2, . . . , and digital data S12 composed of units having numbers n−N, n−N+1, n−N+2, . . . , the multiplexer 102 outputs multiplexed data S13 composed of units having numbers n, n−N, n+1, n−N+1, n+2, n−N+2, . . . .

The operations of the demultiplexer 155, the delay memory 156 and the data selector 157 of the light-signal receiving apparatus 150 will now be described with reference to FIGS. 5 and 6.

Figure 5:
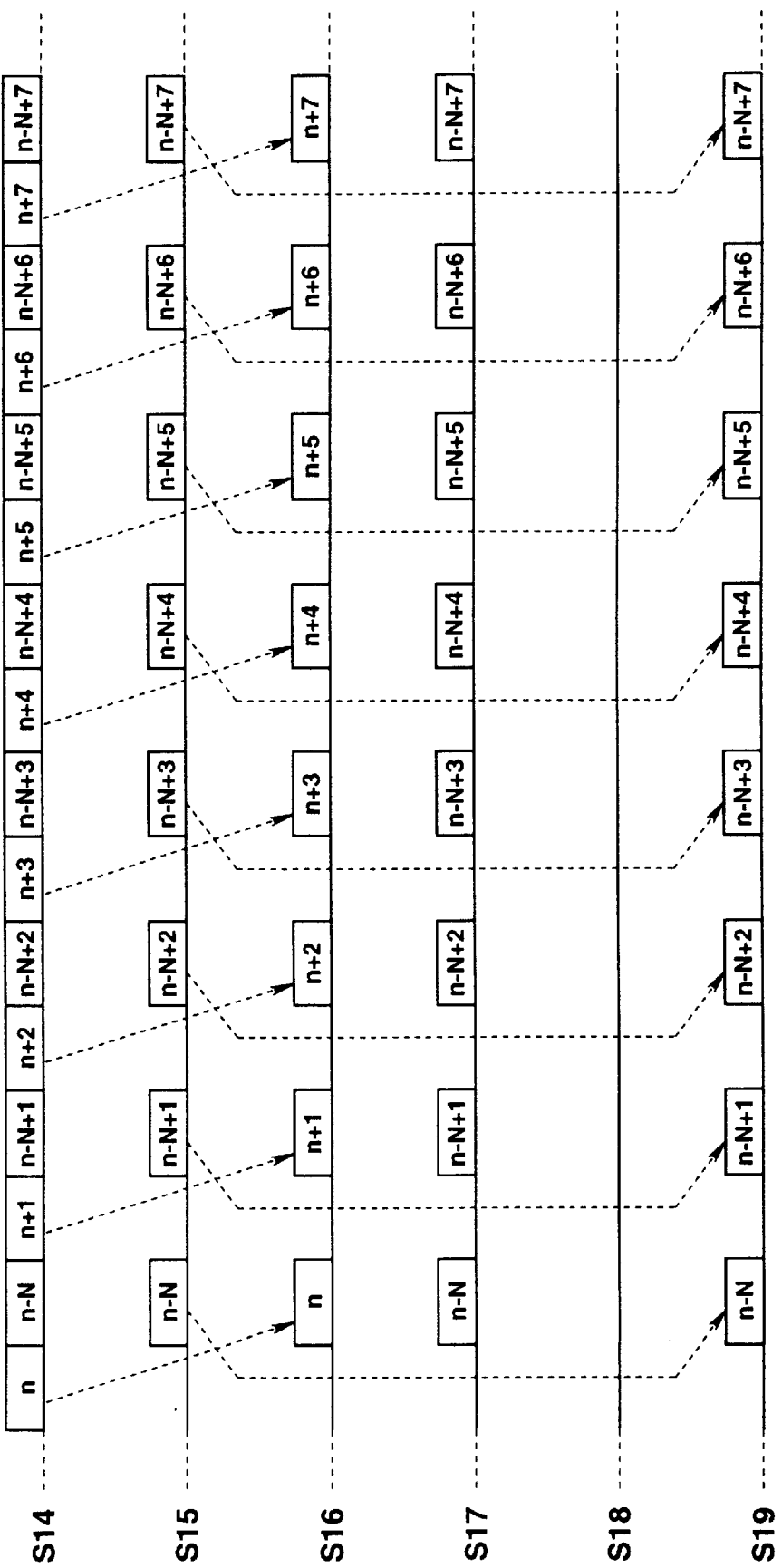
FIG. 5 is a timing chart of the operations of a demultiplexer, a delay memory and a data selector of a light-signal receiving apparatus.

Multiplexed data S14 output from the error correction circuit 154 is, as shown in FIG. 5, a signal corresponding to multiplexed data S13 and composed of units having numbers aligned in the following order as n, n−N, n+1, n−N+1, n+2, n−N+2, . . . . The demultiplexer 155 separates multiplexed data S14 into digital data S15 and digital data S16. That is, digital data S15 is a time sequential signal composed of units having numbers aligned in the following order as n−N, n−N+1, n−N+2, . . . and corresponding to digital data S12. Digital data S16 is a time sequential signal composed of units having numbers in the following order as n, n+1, n+2, . . . , and corresponding to digital data S11.

Digital data S17 is obtained by delaying digital data S16 by a predetermined quantity of delay, that is, by N units by the delay memory 156. As a result of the foregoing process, unit numbers in the digital data S15 and that in the S17 coincide with each other. That is, when digital data S16 having units numbered as n, n+1, n+2, . . . , is supplied to the delay memory 156, the delay memory 156 outputs digital data S17 having units numbered as n−N, n−N+1, n−N+2, . . . .

In response to the error detection signal S18, the data selector 157 selects either of digital data S15 and digital data S17 to output selected digital data S15 or digital data S17 as digital data S19. When the level of the error detection signal S18 is low, a fact that no portion which cannot be corrected exists is indicated. When the level is high, existence of a portion which cannot be corrected, is indicated. In a state shown in FIG. 5, the level of the error detection signal S18 is low and the fact that no portion which cannot be corrected exists is indicated. Therefore, the data selector 157 selects digital data S15 and outputs digital data S19.

A case where correction cannot be corrected by the error correction circuit 154 and the level of the error detection signal S18 is brought to a high level (that is, a case where a portion having an error which cannot be corrected exists) will now be described with reference to FIG. 6.

The case where an error cannot be corrected is, for example, a case where infrared ray L01 is temporarily intercepted by a moving human being or the like.

Figure 6:
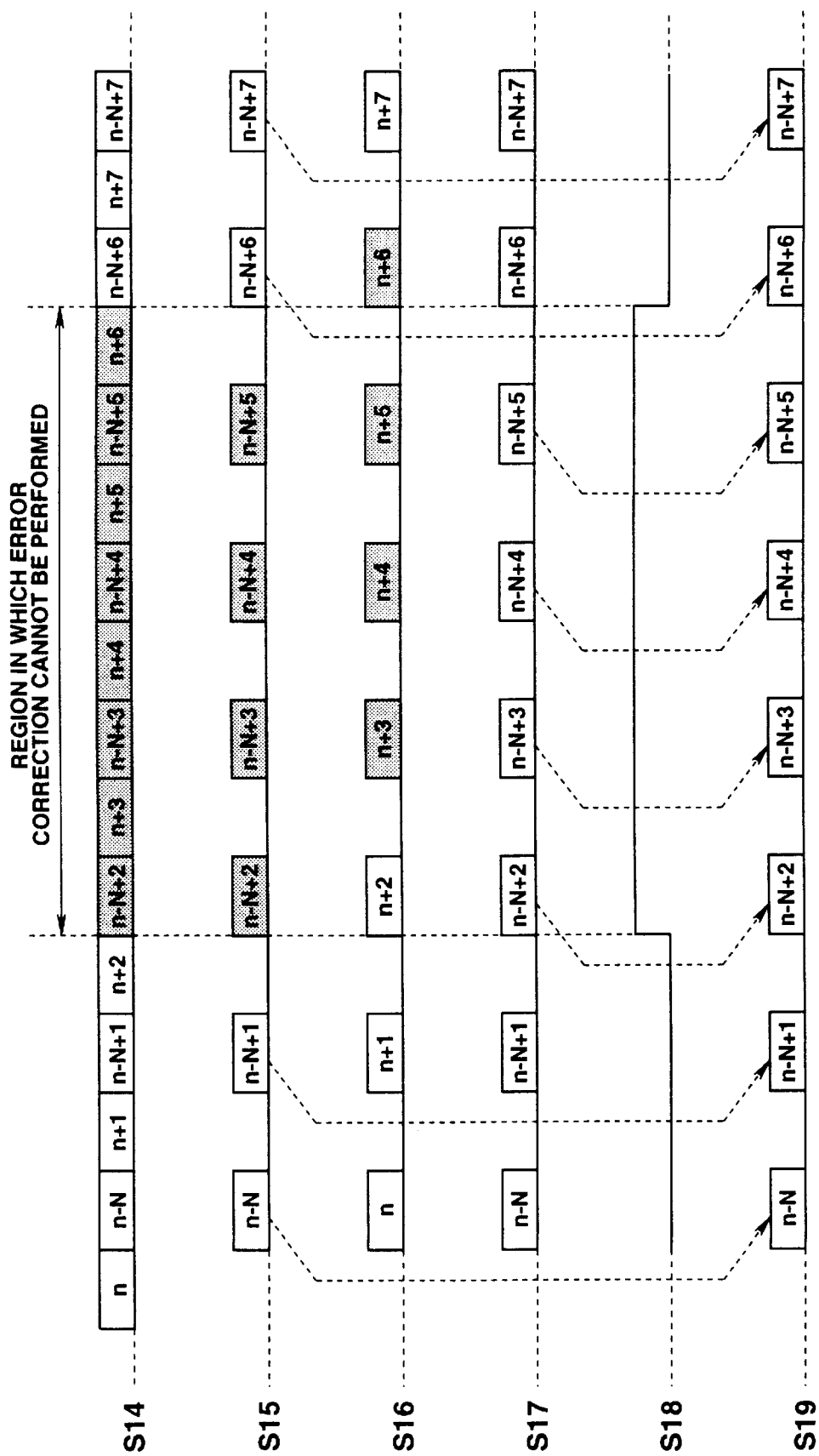
FIG. 6 is a timing chart of the operation of the data selector of the light-signal receiving apparatus.

Referring to FIG. 6, diagonal line portions of multiplexed data S14 output from the error correction circuit 154 are portions each having an error which cannot be corrected.

The demultiplexer 155 separates multiplexed data S14 into digital data S15 and digital data S16. At this time, digital data S15 has units numbered from n−N+2 to n−N+5 which cannot be corrected. On the other hand, digital data S16 has units numbered from n+3 to n+6 which cannot be corrected.

Since digital data S17 is obtained by delaying digital data S16 by N units by the delay memory 156 as described above, the above-mentioned process causes the unit numbers of digital data S15 and those of digital data S17 coincide with each other.

The data selector 157 selects digital data S15 or digital data S17 in response to the error detection signal S18, and then outputs selected digital data S15 or S17 as digital data S19. Therefore, units having numbers from n−N+2 to n−N+5 of S17 are selected and the other units are selected from digital data S15 so as to be output as digital data S19 including no unit of a type having an error which cannot be corrected.

As described above, the light-signal transfer system 10 according to the first embodiment of the present invention is able to continuously transmit data even if an error cannot be corrected attributable to interception of the transfer passage for a period of the interception, the data transfer being permitted if the period in which the error cannot be corrected is shorter than the time corresponding to N units.

That is, supplied digital data is divided into two same digital data items, after which one of the data items is placed distance in terms of time, and then two digital data items are multiplexed and transmitted. The transmitted two digital data items are received, and then digital data item having a relatively excellent quality is selected. Thus, even if the transfer passage is intercepted and if the period of interception is shorter than the time corresponding to a predetermined quantity of delay, transfer of signals can be performed without any interruption caused by the interception.

Figure 7:
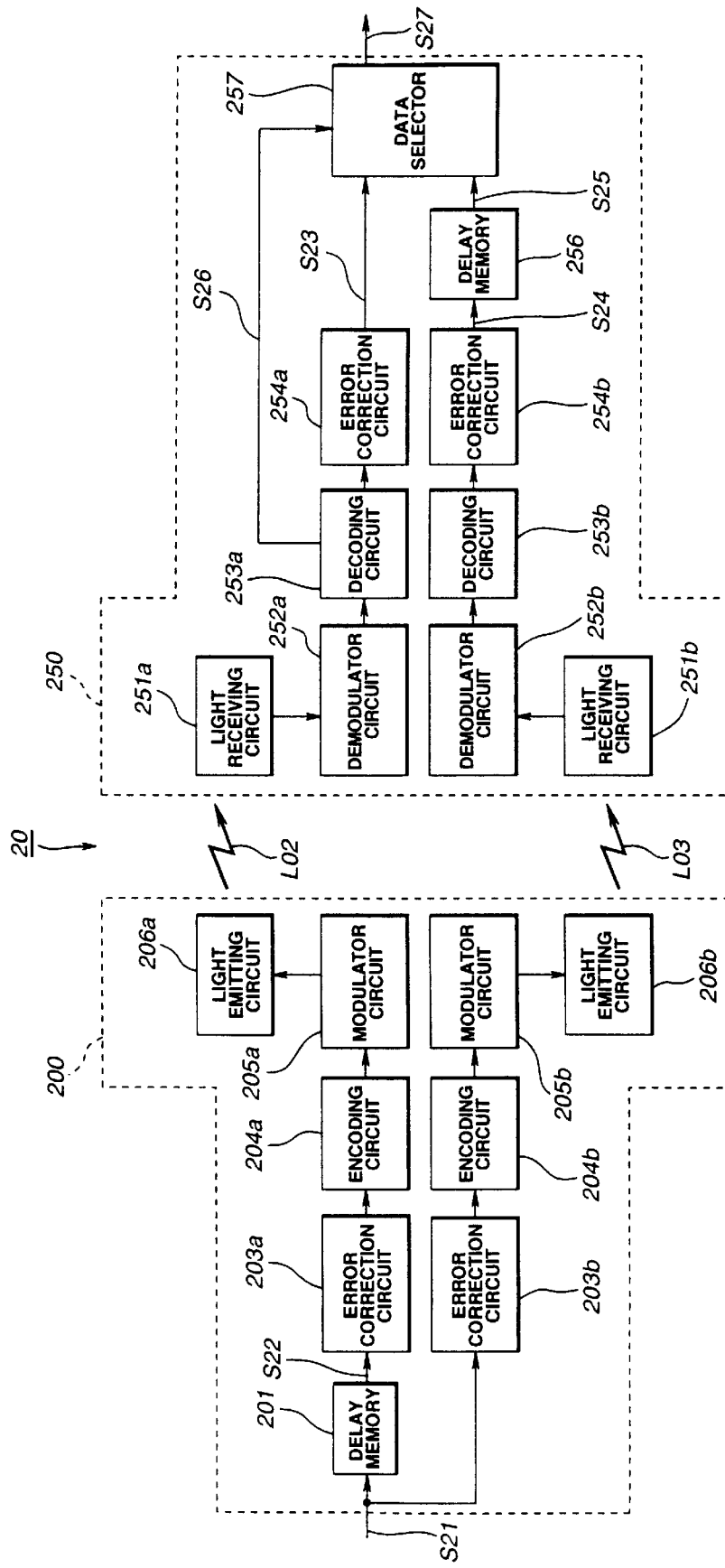
FIG. 7 is a block diagram showing a light-signal transfer system according to a second embodiment of the present invention.

A second embodiment of the light-signal transfer system according to the present invention will now be described. A light-signal transfer system 20 according to this embodiment, as shown in FIG. 7, includes a light-signal transmitting apparatus 200 and a light-signal receiving apparatus 250. Light is transmitted between the light-signal transmitting apparatus 200 and the light-signal receiving apparatus 250 by two infrared rays L02 and L03, sub-carrier waves of which have different frequency bands.

The light-signal transmitting apparatus 200 has a delay memory 201, error correction circuits 203a and 203b, encoding circuits 204a and 204b, modulator circuits 205a and 205b and light emitting circuit 206a and 206b.

Digital data S21 is supplied to the light-signal transmitting apparatus 200. Digital data S21 is a time sequential digital signal, such as a digital audio signal or a digital video signal. Digital data S21 is supplied to the delay memory 201 and the error correction circuit 203b.

The delay memory 201 delays supplied digital data S21 by a predetermined quantity of delay to generate digital data S22, and then supplies digital data S22 to the error correction circuit 203a.

The error correction circuit 203a divides supplied digital data S22 into a predetermined number of blocks, and then adds an error correction code to each block so as to supply the digital data, to which the error correction code has been added, to the encoding circuit 204a as a digital signal. The error correction circuit 203b divides supplied digital data S21 into a predetermined number of blocks, and then adds an error correction code to each block to supply the digital data, to which the error correction code has been added, to the encoding circuit 204b as a digital signal. The encoding circuits 204a and 204b subject the digital signals, to each of which the error correction code has been added, to an interleaving process in block units, and then adds a header, synchronizing data and the like. Then, the encoding circuits 204a and 204b subject the digital signals to an encoding process using an encoding method adaptable to transfer. The digital signals processed as described above are supplied from the encoding circuits 204a and 204b to the modulator circuits 205a and 205b.

The modulator circuits 205a and 205b modulate the digital signals respectively supplied from the encoding circuits 204a and 204b by a predetermined modulating method so as to output transfer signals adaptable to light spatial transfer. As the modulating method, for example DQPSK using a carrier wave having a frequency of 3.75 MHZ is employed. The modulated digital signals are formed into transfer signals each having a frequency in a region from 3 MHZ to 4.5 MHZ. The DQPSK using a carrier wave having a frequency of 5.25 MHZ is employed in the modulator circuit 205b, and then the modulated digital signal is formed into a transfer signal having a frequency band of 4.5 MHZ to 6 MHZ.

Each of the light emitting circuit 206a and 206b includes an optical device for emitting an infrared ray and a diffuser. As the optical device, a light emitting diode or a laser diode is employed. The light emitting circuits 206a and 206b emit infrared rays L02 and L03 to a space when the transfer signals supplied from the modulator circuits 205a and 205b operate the optical devices or the like of the light emitting circuit 206a and 206b.

The infrared rays L02 and L03 emitted from the light emitting circuit 206a and 206b to the space are supplied to the light-signal receiving apparatus 250.

The light-signal receiving apparatus 250 includes light receiving circuits 251a and 251b, demodulator circuits 252a and 252b, encoding circuits 253a and 253b, error correction circuits 254a and 254b, a delay memory 256 and a data selector 257.

Each of the light receiving circuits 251a and 251b includes a photoelectric transfer device, a lens and the like and arranged to receive infrared rays L02 and L03 to generate light receipt signals each having a level which is changed in accordance with the quantity of each of the infrared rays L02 and L03. As a result, the light receiving circuits 251a and 251b receive the transfer signals and correct the levels of the transfer signals by automatic gain control circuits (not shown) thereof to supply the corrected transfer signals to the demodulator circuits 252a and 252b.

Each of the demodulator circuits 252a and 252b reproduces a carrier wave from the transfer signal to demodulate the digital signal from the carrier wave by a demodulating method corresponding to the modulator circuits 205a and 205b. The demodulator circuits 252a and 252b supply the demodulated digital signals to the decoding circuits 253a and 253b.

Each of the decoding circuit 253a and 253b detects, from each of the digital signals, synchronizing data, the header and the like to decode the digital signal by a decoding method corresponding to the encoding circuits 204a and 204b relative to a result of the detection. Then, the decoding circuits 253a and 253b subject results of the decoding operations to a deinterleaving process to output digital signals, to each of which the error correction code has been added.

The error correction circuits 254a and 254b use the error correction code of the digital signal to correct an error of the digital signals so as to correct a bit error generated in the spatial transfer performed in a region from the light-signal transmitting apparatus 200 to the light-signal receiving apparatus 250. Thus, the error correction circuits 254a and 254b output digital data S23 and digital data S24 of the digital signals each having a quality restored from the state of the quality lost during the transfer. Digital data S23 corresponds to digital data S22, while digital data S24 corresponds digital data S21. Moreover, the error correction circuit 254a supplies, to the data selector 257, error detection signal S26 indicating whether or not an error has been detected and whether or not the error can be corrected.

The delay memory 256 delay supplied digital data S24 by a quantity which is the same as the quantity of delay realized by the delay memory 201 to generate digital data S25. As a result of the above-mentioned process, the time base of digital data S25 coincides with the time base of digital data S23.

In accordance with information indicated by the error detection signal S26, the data selector 257 selects digital data S23 or digital data S25. The data selector 257 outputs selected digital data S23 or digital data S25 as digital data S27. That is, when the error detection signal S26 indicates that no portion having an error which cannot be corrected exists, the data selector 257 selects digital data S23 and outputs digital data S23 as digital data S27. When the error detection signal S26 indicates that a portion having an error which cannot be corrected exists, the data selector 257 selects digital data S25 to output digital data S25 as digital data S27.

A case where correction cannot be corrected by the error correction circuit 254a and the level of the error detection signal S26 is brought to a high level (that is, a case where a portion having an error which cannot be corrected exists) will now be described with reference to FIG. 8.

The case where an error cannot be corrected is, for example, a case where both of the infrared rays L02 and L03 or only the infrared ray L02 is temporarily intercepted by a moving human being or the like. The case where only the infrared ray L02 is temporarily intercepted is a case where the transfer passages of the infrared rays L02 and L03 are sufficiently distant from the object which intercepts the infrared ray.

Figure 8:
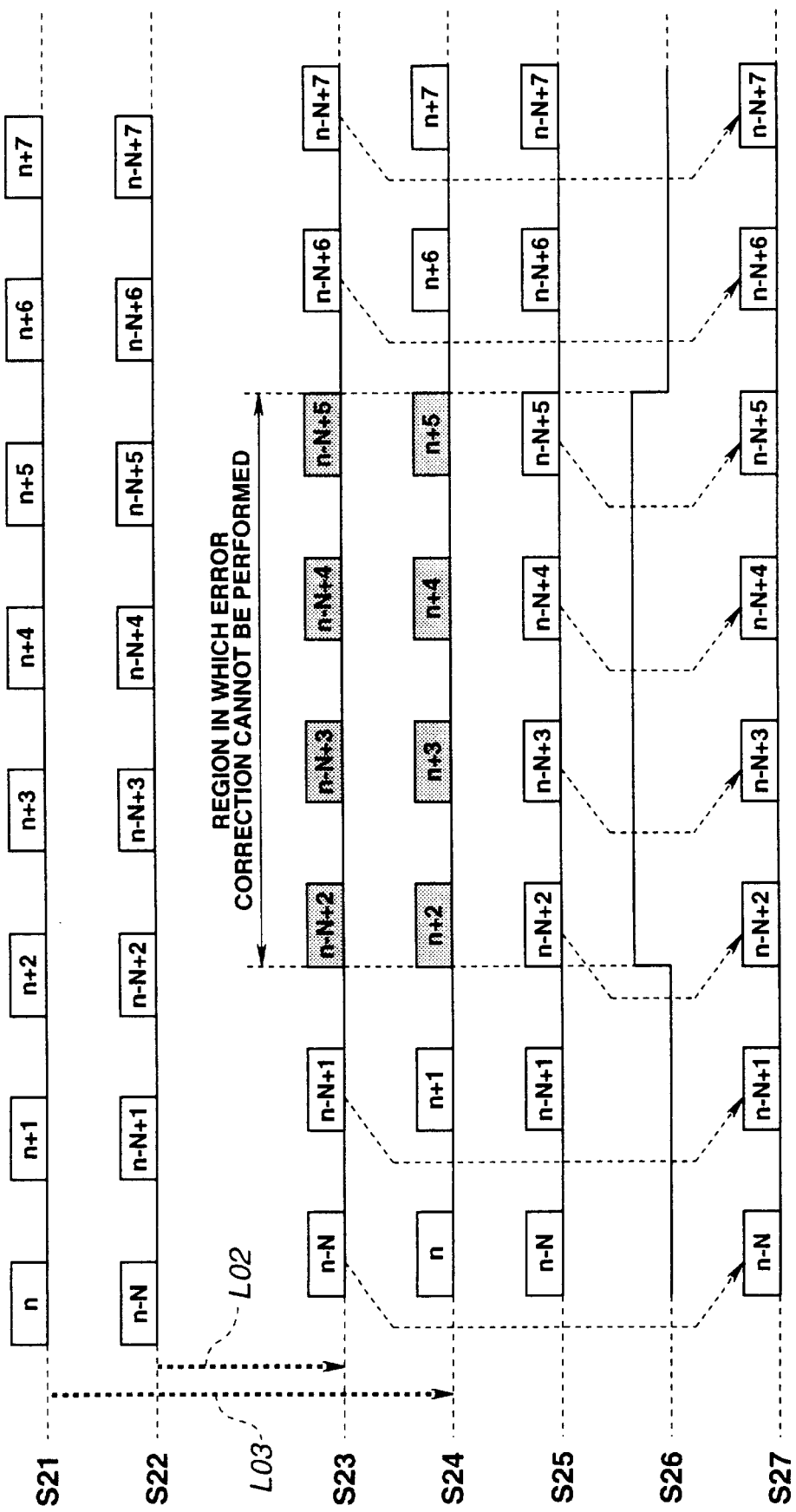
FIG. 8 is a timing chart of the operation of the light-signal transfer system which is performed when error correction cannot be performed.

Referring to FIG. 8, diagonal line portions of digital data S23 output from the error correction circuit 254a are portions each having an error which cannot be corrected. Also S24 output from the error correction circuit 254b is provided with diagonal lines to indicate that each of the diagonal line portions has an error which cannot be corrected. Even if the error in the foregoing portion can be corrected, the following description can be applied to the case.

Digital data S21 is a signal similar to digital data S11 according to the first embodiment and having units numbered from n to n+7. Digital data S22 is obtained by delaying digital data S21 by N units by the delay memory 201. Therefore, digital data S22 has units numbered from n−N to n−N+7. As described above, digital data S21 and digital data S22 are transmitted to the light-signal receiving apparatus 250 by the infrared rays L03 and L02.

The light-signal receiving apparatus 250 receives infrared rays L02 and L03 to generate digital data S23 and digital data S24. An assumption is made that the transfer passages for the infrared rays L02 and L03 are intercepted and thus a portion having an error which cannot be generated in a range from a unit having number n−N+2 to a unit having number n−N+5 of digital data S23 and in a range from a unit having number n+2 to n+5 of digital data S24. The level of the error detection signal S26 is brought to a high level in each of the above-mentioned ranges having an error which cannot be corrected.

Digital data S24 is, by the delay memory 256, subjected to a process in which it is delayed by N units so as to be formed into digital data S25. As a result, the unit numbers of digital data S25 coincide with those of digital data S23.

The data selector 257 selects either of digital data S23 or digital data S25 in response to the error detection signal S26 to output selected digital data S23 or digital data S25 as digital data S27. Therefore, digital data S25 is selected in a range where the level of the error detection signal S26 is high, while digital data S23 is selected in other ranges. Thus, selected digital data is output as digital data S27 having no unit of a type which cannot be corrected.

As described above, the light-signal transfer system 20 according to the second embodiment of the present invention is arranged in such a manner that supplied digital data into the two same digital data items. Moreover, either of the two digital data items is placed apart from the other digital data in terms of time, and the two digital data items are multiplexed and transmitted. The two transmitted digital data items are received and either of the two digital data items having superior quality is selected. Thus, if interception or the like takes place on the transfer passage and an error cannot be corrected in the period of the interception, continuous data transfer can be permitted if the period is shorter than the time corresponding to N units.

Moreover, the light-signal transfer system 20 according to the second embodiment is arranged in such a manner that the transfer passages for the infrared ray L02 and the infrared ray L03 are sufficiently distant from each other in the space so that only either of the transfer passages is intercepted and the other transfer passage is not intercepted. As a result, continuous transfer of data can be performed regardless of the predetermined quantity of delay. The reason for this lies in that the structure for performing light transfer regardless of the predetermined quantity of delay does not substantially make the time difference between digital data S21 which is supplied to the light-signal transmitting apparatus 200 and digital data S27 which is output from the light-signal receiving apparatus 250 if the time required to perform processes from the error correction circuits 203a and 203b of the light-signal transmitting apparatus 200 to the error correction circuits 254a and 254b of the light-signal receiving apparatus 250 is sufficiently short. That is, if the delay memories 201 and 256 of the light-signal transfer system 20 according to the second embodiment of the present invention are not provided, that is, if the predetermined quantity of delay satisfies N=0, real time transfer can be performed.

Figure 9:
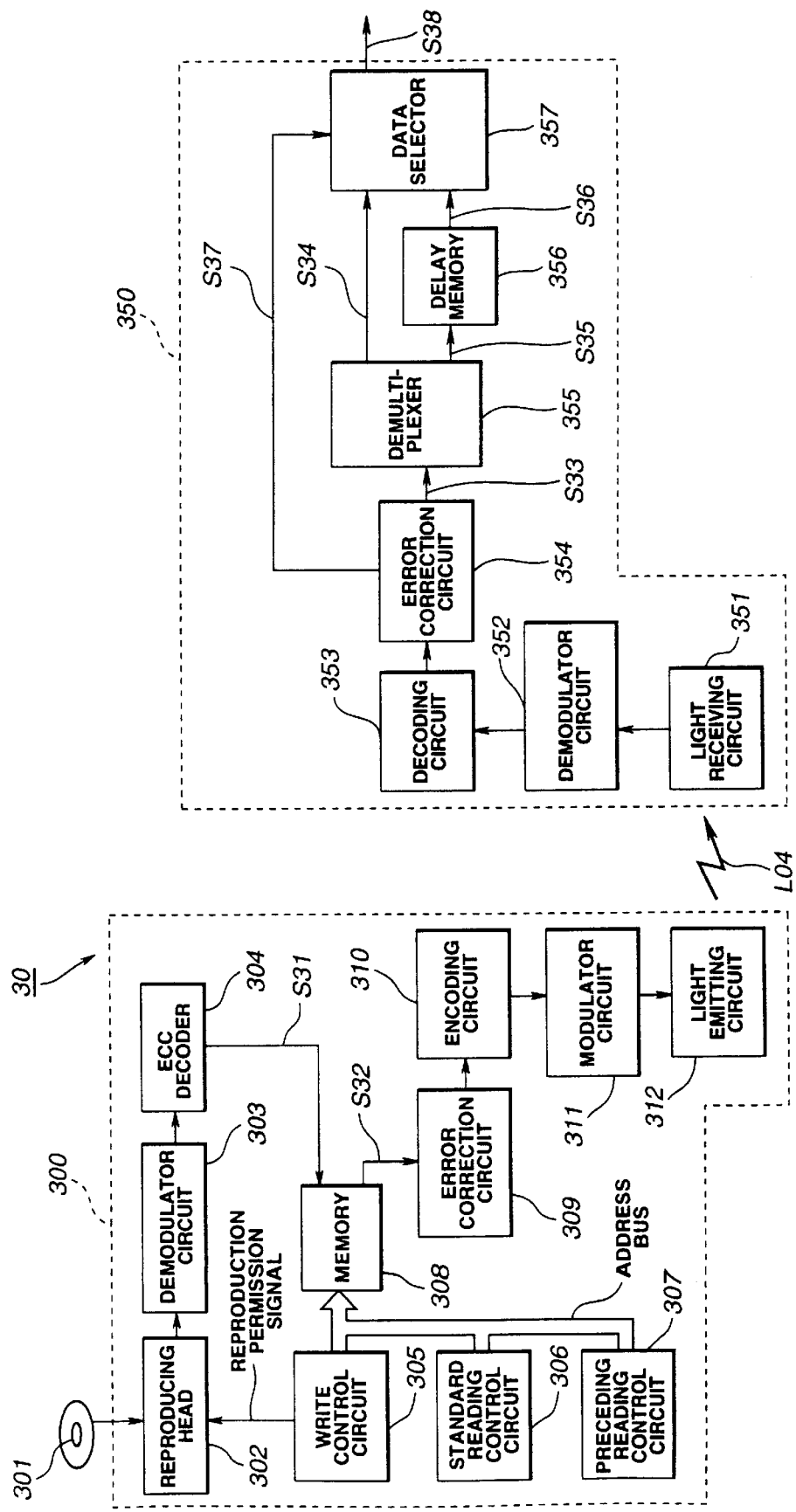
FIG. 9 is a block diagram showing a light-signal transfer system according to a third embodiment of the present invention.

A third embodiment of the light-signal transfer system according to the present invention will now be described. As shown in FIG. 9, the light-signal transfer system 30 includes a light-signal transmitting apparatus 300 and a light-signal receiving apparatus 350.

The light-signal transmitting apparatus 300 has a function of reproducing a digital signal from a disk 301 and a function of transmitting the digital signal. The light-signal transmitting apparatus 300 has a reproducing head 302, a demodulator circuit 303 and an ECC decoder 304 to reproduce a signal from the disk 301 store the signal in a memory 308 as digital data. The light-signal transmitting apparatus 300 has an error correction circuit 309, an encoding circuit 310, a modulator circuit 311 and a light emitting circuit 312 to optically transmit digital data recorded on the memory 308. The light-signal transmitting apparatus 300 has a write control circuit 305, a standard reading control circuit 306 and a preceding reading control circuit 307 to control recording/reading of digital data to and from the memory 308.

The disk 301 may be, for example, a digital audio disk, an MD ("Mini Disc" trade name of SONY), a magneto-optical disk, a phase-change disk or the like. As an alternative to the disk 301, a hard disk, an IC card or the like may be employed.

The reproducing head 302 reads a signal recorded on the disk 301 at a rate higher than the original transfer rate (hereinafter called a "standard transfer rate") of the signal in accordance with a reproduction permission signal supplied from a write control circuit 305 to be described later so as to output the signal to the demodulator circuit 303.

The demodulator circuit 303 employs a demodulating method corresponding to a modulation method, such as EFM (Eight Fourteen Modulation), employed when the signal has been recorded to demodulate the signal supplied from the reproducing head 302. The signal demodulated by the demodulator circuit 303 is output to the ECC decoder 304.

The ECC decoder 304 uses the error correction code included in the demodulated signal to correct the demodulated signal so as to output the corrected signal to the memory 308 as digital data S31.

The operation for writing digital data S31 on the memory 308 through the address bus is controlled by the write control circuit 305.

The write control circuit 305 controls the operation for writing digital data S31 supplied from the ECC decoder 304 on the memory 308. The writing speed at this time is in proportion to the reading speed of the reproducing head 302. The write control circuit 305 always monitors en available space in the memory 308 to interrupt the operation for reading a signal from the disk 301, which is performed by the reproducing head 302, in accordance with the reproduction permission signal if no available space exists in the memory 308. The write control circuit 305 resumes reading of a signal from the disk by the reproducing head 302 in accordance with the reproduction permission signal when a predetermined available block is created in the memory 308. The write control circuit 305 repeats above-mentioned operation to perform control in such a manner that digital data in a quantity larger than a predetermined quantity is always stored in the memory 308.

The operation of reading digital data S32 from the memory 308 is controlled by the standard reading control circuit 306 and the preceding reading control circuit 307 through the address bus.

The standard reading control circuit 306 performs control for reading digital data from the memory 308 in the order from the write start address after digital data S31 has been first written on the memory 308. The reading speed at this time is adaptable to the standard transfer rate.

The preceding reading control circuit 307 performs control for reading digital data from the memory 308 in the order from an address, which is larger than the write start address by a predetermined offset quantity, after digital data S31 has been written on the memory 308 by a quantity larger than a predetermined quantity. As a result, digital data read by the preceding reading control circuit 307 precedes digital data, which is read by the standard reading control circuit 306. The reading speed at this time is adaptable to the standard transfer rate.

Digital data S32 read from the memory 308 is formed into a signal in which digital data read by the standard reading control circuit 306 and digital data read by the preceding reading control circuit 307 are alternately multiplexed because the standard reading control circuit 306 and the preceding reading control circuit 307 alternately read digital data from the memory 308. When digital data has not been written on the memory 308 in a predetermined quantity, reading of digital data by the preceding reading control circuit 307 is not performed. However, a portion of digital data S32 obtained by the preceding reading control circuit 307 is replaced by dummy data. The operations for writing/reading data to and from the memory 308 will be described later.

The error correction circuit 309 divides supplied digital data S32 into a predetermined number of blocks, and then an error correction code is added to each block so as to supply digital data to the encoding circuit 310 as a digital signal.

The encoding circuit 310 subjects the digital signal, to which the error correction code has been added, to an interleaving process in block units, and then adds a header and synchronizing data to subject the digital signal to an encoding process by an encoding method adaptable to transfer.

The modulator circuit 311 modulates the digital signal supplied from the encoding circuit 310 by a predetermined modulating method to output a transfer signal adaptable to optical spatial transfer. As the modulating method, for example DQPSK using a carrier wave having a frequency of 4.5 MHZ is employed. The modulated digital signal is formed into a transfer signal having a frequency band from 3 MHZ to 6 MHZ.

The light emitting circuit 312 includes an optical device for emitting an infrared ray and a diffuser. As the optical device, a light emitting diode, a laser diode or the like is employed. The light emitting circuit 312 emits infrared ray L04 to a space when the transfer signal supplied from the modulator circuit 311 operates the optical device or the like.

The infrared ray L04 emitted from the light emitting circuit 312 to the space is supplied to the light-signal receiving apparatus 350.

The light-signal receiving apparatus 350 includes a light receiving circuit 351, a demodulator circuit 352, a decoding circuit 353, an error correction circuit 354, a demultiplexer 355, a delay memory 356 and a data selector 357.

The light receiving circuit 351 includes a photoelectric transfer device, a lens and the like. The light receiving circuit 351 receives infrared ray L04 to generate a light receipt signal having a level which is changed in accordance with the quantity of the infrared ray L04. As a result, the light receiving circuit 351 receives the transfer signal and corrects the level of the transfer signal by an automatic gain control circuit (not shown) thereof to supply the corrected transfer signal to the demodulator circuit 352.

The demodulator circuit 352 reproduces a carrier wave from the transfer signal output from the light receiving circuit 351 to demodulate the digital signal from the carrier wave by a demodulating method corresponding to the modulator circuit 311. The demodulator circuit 352 supplies the demodulated digital signal to the decoding circuit 353.

The decoding circuit 353 detects, from the digital signal, synchronizing data, the header and the like to decode the digital signal by a decoding method corresponding to the encoding circuit 310 relative to a result of the detection. Then, the decoding circuit 353 subjects a result of the decoding operation to a deinterleaving process to supply the digital signal to which the error correction code has been added.

The error correction circuit 354 uses the error correction code of the digital signal to correct an error of the digital signal so as to correct a bit error generated in the spatial transfer performed in a region from the light-signal transmitting apparatus 300 to the light-signal receiving apparatus 350. Thus, the error correction circuit 354 outputs digital data S33 having a quality restored from the state of the quality lost during the transfer. Digital data S33 corresponds to digital data S32. Moreover, the error correction circuit 354 supplies, to the data selector 357, error detection signal S37 indicating whether or not an error has been detected and whether or not the error can be corrected.

The demultiplexer 355 separates digital data S33 into digital data S34 and digital data S35 respectively corresponding to digital data read from the memory 308 by the standard reading control circuit 306 and the preceding reading control circuit 307. The demultiplexer 355 supplies digital data S34 to the data selector 357 and supplies digital data S35 to the delay memory 356.

The delay memory 356 delays supplied digital data S35 by a quantity corresponding to the quantity of digital data which is previously read by the preceding reading control circuit 307 to the standard reading control circuit 306 to generate digital data S36. As a result of the above-mentioned process, the time base of digital data S36 coincides with the time base of the digital data S34.

In accordance with information indicated by an error detection signal S37, the data selector 357 selects digital data S34 or digital data S36. The data selector 357 outputs selected digital data S34 or digital data S36 as digital data S38. That is, when the error detection signal S37 indicates that no portion having an error which cannot be corrected exists, the data selector 357 selects digital data S34 and outputs digital data S34 as digital data S38. When the error detection signal S37 indicates that a portion having an error which cannot be corrected exists, the data selector 357 selects digital data S36 to output digital data S36 as digital data S38.

The operation for writing/reading data to and from the memory 308 will now be described with reference to FIGS. 10A to 10D.

Digital data S31 and S32 have units numbered similarly to the units of digital data according to the first embodiment. Illustrated timing signals indicate timing at which data is, by the standard reading control circuit 306, read from the memory 308 by the standard reading control circuit 306 when the level of the timing signal is high. When the level of the timing signal is low, data is read from the memory 308 by the preceding reading control circuit 307. Although the transfer rate of digital data S31 is made to be two times the standard transfer rate, any rate may be employed if the rate is higher than the standard transfer rate.

FIG. 10A shows a state of digital data S31, which is first written on the memory 308 and that of digital data S32 which is first read from the memory 308. The write control circuit 305 performs control in such a manner that digital data S31 is sequentially written on the memory 308 at a rate which is two times the standard transfer rate in the order starting at a unit having number 0. After digital data S31 has been recorded on the memory 308, the standard reading control circuit 306 reads and outputs digital data S32 at the standard transfer rate starting from the unit having number 0 in a region in which the level of the timing signal is high. Since a signal to be read does not exist on the memory 308 at this time, the preceding reading control circuit 307 does not read a signal. As an alternative to this, the preceding reading control circuit 307 outputs dummy data onto digital data S32.

After the write control circuit 305 and the standard reading control circuit 306 have continued writing and reading of signals to and from the memory 308, the difference of the unit numbers of the units in the signals to be written on the memory 308 by the write control circuit 305 and the unit numbers of the units in the signals to be read from the memory 308 by the standard reading control circuit 306 is made to be N. In this case, the preceding reading control circuit 307, as shown in FIG. 10B, reads digital data onto digital data S32 from the memory 308 at the standard transfer rate in the order starting from unit number 2N. As a result, digital data S32 can be multiplexed in such a manner that the signal read by the standard reading control circuit 306 and that read by the preceding reading control circuit 307 are multiplexed. The signal read by the preceding reading control circuit 307 precedes the signal read by the standard reading control circuit 306 by N units.

When writing/reading of signals to and from the memory 308 by the write control circuit 305, the standard reading control circuit 306 and the preceding reading control circuit 307 have been continued, the difference from the unit numbers of the signals to be written on the memory 308 by the write control circuit 305 and the unit numbers of the signals to be read from the memory 308 by the standard reading control circuit 306 is made to be M units which is the capacity of the memory 308. In this case, the write control circuit 305 interrupts the reproduction of the disk 301 by the reproducing head 302 as shown in FIG. 10C to prevent signals from overflowing the memory 308.

When reading of signals from the memory 308 by the standard reading control circuit 306 and the preceding reading control circuit 307 have been continued from a state where reproduction of the disk 301 has been interrupted, the unit number of the signal finally written on the memory 308 and the unit number of the signal which is read from the memory 308 by the preceding reading control circuit 307 coincide with each other. In this case, the write control circuit 305 resumes reproduction of the disk 301 by the reproducing head 302 to prevent signals from underflowing the memory 308 as shown in FIG. 10D.

As described above, the write control circuit 305 interrupts reproduction of the disk 301, which is performed by the reproducing head 302 when the difference from the unit number of the signal to be written on the memory 308 to the unit number of the signal to be read from the memory 308 by the standard reading control circuit 306 is made to be M units. When the unit number of the signal finally written on the memory 308 and the unit number of the signal read from the memory 308 by the preceding reading control circuit 307 coincide with each other, the write control circuit 305 resumes reproduction of the disk 301 which is performed by the reproducing head 302. Note that the timing of the reproduction of the disk 301 and that of resuming the same have somewhat degree of freedom. Therefore, the timings can arbitrarily be determined if the memory 308 does not overflowed or underflowed with signals.

Note that the M units which is the capacity of the memory 308 and the N units of the signal read by the preceding reading control circuit 307 and preceding to the signal read by the standard reading control circuit 306 must satisfy the relationship as M≧N.

The time taken for the operation of the preceding reading control circuit 307 to be started is the same as the time required for the standard reading control circuit 306 to read signals for N units as shown in FIG. 10B when the signal reproducing rate from the disk 301 is two times the standard transfer rate. If the rate at which signals are reproduced from the disk 301 is a times the standard transfer rate, the time for the operation of the preceding reading control circuit 307 to be started is the same as the time required for the standard reading control circuit 306 to read signal for N/(a−1) units. Therefore, if the rate at which the disk is reproduced raised, the time required for the operation of the preceding reading control circuit 307 to be started can be shortened.

Since the operation of the light-signal receiving apparatus 350 is the same as that of the light-signal receiving apparatus 150 according to the first embodiment of the present invention after time for N/(a−1) units has elapsed from start of the transfer when the rate at which the disk 301 is reproduced is a times the standard transfer rate, the detailed description of the operation is omitted here.

As described above, the light-signal transfer system according to the third embodiment of the present invention is able to continuously reproduce data after the time corresponding to N/(a−1) units has elapsed from start of the transfer under condition that the period in which an error cannot be corrected is shorter than the time corresponding to N units even if the error cannot be corrected in a period of interception because of interception of the transfer passage or the like. Moreover, reproduction of the disk 301, which is performed by the light-signal transmitting apparatus 300, and output of digital data S38, which is performed by the light-signal receiving apparatus 350, can be performed substantially simultaneously.

A modification of the third embodiment of the present invention may be employed in which the standard reading control circuit 306 reads data from the memory 308 at a timing after data for N units has been recorded on the memory 308 in place of the timing at which digital data S31 has been first recorded on the memory 308.

In the foregoing case, the timing at which the operations of the standard reading control circuit 306 and the preceding reading control circuit 307 are started is a timing after the time corresponding to N/a units has elapsed from start of the reproduction of data from the disk 301. That is, after the time corresponding to N/a units has elapsed from start of the reproduction of the disk 301 by the light-signal transmitting apparatus 300, digital data is transmitted. Thus, even if interception takes place on the transfer passage and error correction cannot be performed in the period of the interception, the light-signal receiving apparatus 350 is able to continuously reproduce data on condition that the period in which error correction cannot be performed is shorter than the time corresponding to N units.

Figure 11:
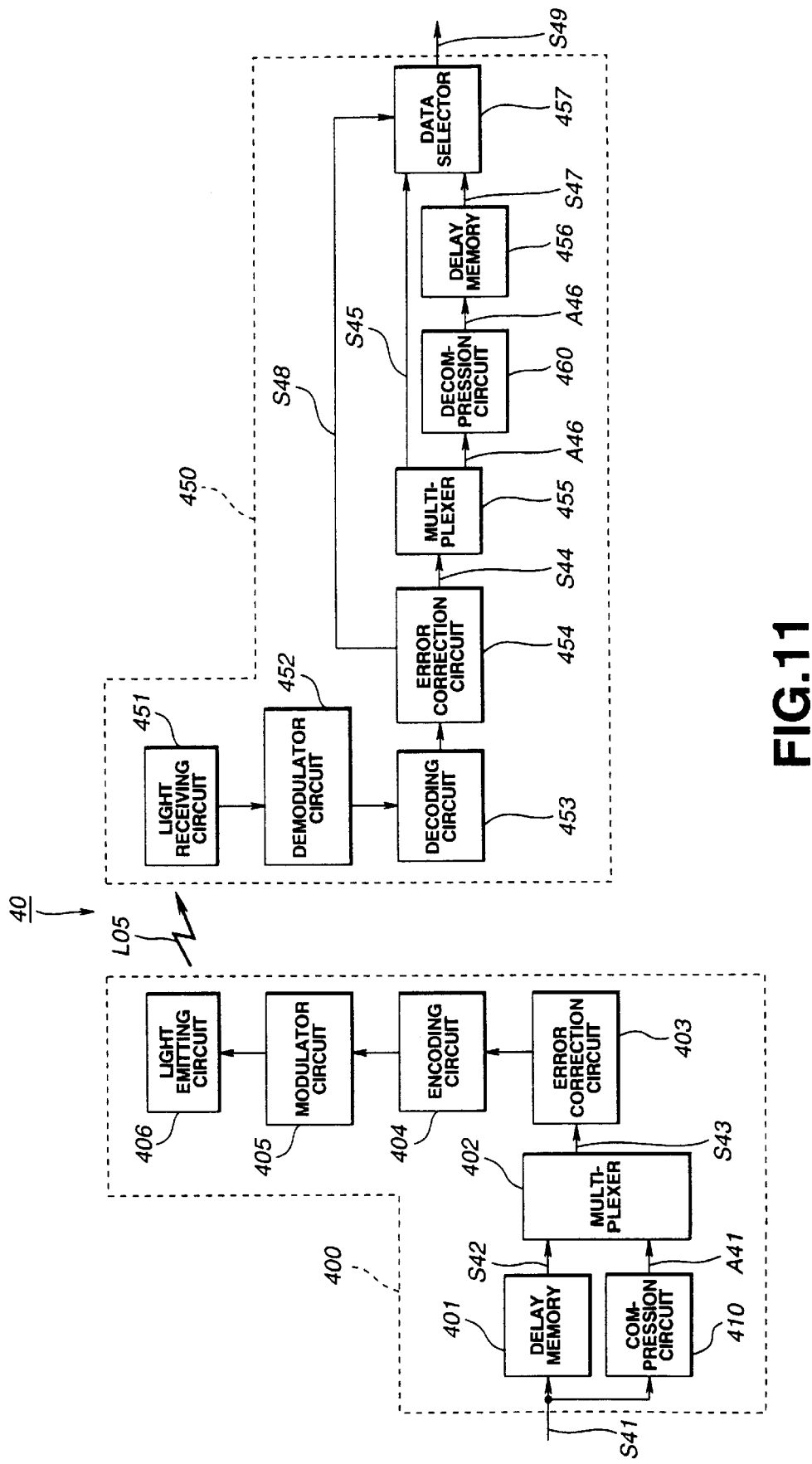
FIG. 11 is a block diagram showing a light-signal transfer system according to a fourth embodiment of the present invention.

A fourth embodiment of the light-signal transfer system according to the present invention will now be described. As shown in FIG. 11, a light-signal transfer system 40 includes a light-signal transmitting apparatus 400 and a light-signal receiving apparatus 450. The light-signal transfer system 40 has a structure obtained by adding a compression circuit 410 and a decompression circuit 460 to the light-signal transfer system 10 according to the first embodiment.

The light-signal transmitting apparatus 400 has a delay memory 401, a multiplexer 402, an error correction circuit 403, an encoding circuit 404, a modulator circuit 405, a light emitting circuit 406 and the compression circuit 410.

Digital data S41 is supplied to the light-signal transmitting apparatus 400. Digital data S41 is supplied to the delay memory 401 and the compression circuit 410.

The delay memory 401 delays supplied digital data S41 by a predetermined quantity of delay to generate digital data S42 so as to output digital data S42 to the multiplexer 402.

The compression circuit 410 compresses and encodes supplied digital data S41 to generate compressed signal A41 to output the same to the multiplexer 402. As a method of compressing and encoding digital data, a method in conformity with ISO/IEC 13818-3 (so-called MPEG Audio) which is an international standard may be employed if digital data S41 is a digital audio signal. If digital data S41 is a digital video signal, a method in conformity with ISO/IEC 13818-2 (so-called MPEG Video) which is an international standard may be employed.

The multiplexer 402 multiplexes two supplied digital data items S42 and the compressed signal A41 to generate multiplexed data S43 to output multiplexed data S43 to the error correction circuit 403.

The error correction circuit 403 divides supplied multiplexed data S43 into a predetermined number of blocks, and then adds an error correction code to each unit so as to supply a digital signal to the encoding circuit 404.

The encoding circuit 404 subjects the digital signal, to which the error correction code has been added, to an interleaving process in block units, and then adds a header, synchronizing data and the like. Then, the encoding circuit 404 subjects the digital signal to an encoding process using an encoding method adaptable to transfer. Then, the digital signal is supplied from the encoding circuit 404 to the modulator circuit 405.

The modulator circuit 405 modulates the digital signal supplied from the encoding circuit 404 by a predetermined modulating method to output a transfer signal adaptable to the optical space transfer.

The light emitting circuit 406 includes an optical device for emitting an infrared ray and a diffuser. The light emitting circuit 406 emits an infrared ray L05 to a space when a transfer signal supplied from the modulator circuit 405 operates the optical device or the like.

The transfer band for the infrared ray L05 can be reduced as compared with the transfer band for the infrared ray L01 for use in the light-signal transfer system according to the first embodiment because either of the two digital data items to be transmitted is compressed. Assuming that the rate of digital data is 1 and the degree of compression of the compressing and encoding method is b (b<1), the ratio of the transfer band for the infrared ray L01 and that for the infrared ray L05 is 2:(1+b).

The infrared ray L05 emitted from the light emitting circuit 406 to the space is supplied to the light-signal receiving apparatus 450.

The light-signal receiving apparatus 450 has a light receiving circuit 451, a demodulator circuit 452, a decoding circuit 453, an error correction circuit 454, a multiplexer 455, a delay memory 456, a data selector 457 and a decompression circuit 460.

The light receiving circuit 451 receives the infrared ray L05 to generate a receipt signal having the level which is changed in accordance with change in the light quantity of the infrared ray L05. As a result, the light receiving circuit 451 receives the transfer signal and corrects the level of the transfer signal by an automatic gain control circuit (not shown) thereof to output the corrected signal to the demodulator circuit 452.

The demodulator circuit 452 reproduces a carrier wave from the transfer signal output from the light receiving circuit 451, and then demodulates a digital signal from the carrier wave by a demodulating method corresponding to the modulator circuit 405. The demodulator circuit 452 outputs the digital signal to the decoding circuit 453.

The decoding circuit 453 detects synchronizing data, the header and the like from the digital signal, and then decodes the digital signal by a decoding method corresponding to the encoding circuit 404 relative to a result of the detection. Then, the decoding circuit 453 subjects a result of the decoding process to a deinterleaving process to output a digital signal to which the error correction code has been added.

The error correction circuit 454 uses the error correction code of the digital signal to correct an error of the digital signal so as to correct a bit error generated in the spatial transfer performed in a region from the light-signal transmitting apparatus 400 to the light-signal receiving apparatus 450. Thus, the error correction circuit 454 outputs multiplexed data S44 of the digital signal having a quality restored from the state of the quality lost during the transfer. Multiplexed data S44 is a signal corresponding to multiplexed data S43 obtained by multiplexing digital data S41 and compressed signal A41. Moreover, the error correction circuit 454 supplies, to the data selector 457, error detection signal S48 indicating whether or not an error has been detected and whether or not the error can be corrected.

The multiplexer 455 separates multiplexed data S44 into digital data S45 and compressed signal A46. The multiplexer 455 supplies separated digital data S45 to the data selector 457 and supplies the compressed signal A46 to the decompression circuit 460. Digital data S45 corresponds to digital data S42, while compressed signal A46 corresponds to the compressed signal A41.

The decompression circuit 460 employs a method corresponding to the compressing and encoding method employed in the compression circuit 410 to decompress the compressed signal A46 so as to generate digital data S46. Digital data S46 is supplied to the delay memory 456.

The delay memory 456 delays supplied digital data S46 by the quantity of delay which is the same as the delay realized by the delay memory 401 to generate digital data S47. As a result of the above-mentioned process, the time base of digital data S47 coincides with the time base of digital data S45.

Although the light-signal transfer system 40 has the structure in which the decompression circuit 460 is disposed in front of the delay memory 456, the order may be reversed. In this case, the capacity of the delay memory 456 can be reduced by a degree of compression of data. The capacity of the delay memory 456 is selected in such a manner that the time bases of the finally decompressed S47 and S45 finally coincide with each other.

The data selector 457 selects digital data S45 or digital data S47 in accordance with information of the error detection signal S48 to output selected digital data S45 or digital data S47 as digital data S49. That is, when the error detection signal S48 indicates that no portion exists having an error which cannot be corrected, the data selector 457 selects digital data S45 to output digital data S45 as digital data S49. When the error detection signal S48 indicates that a portion having an error which cannot be corrected exists, the data selector 457 selects digital data S47 to output digital data S47 as digital data S49.

As described above, the light-signal transfer system according to the fourth embodiment of the present invention is arranged in such a manner that supplied digital data is divided into two same digital data items. Moreover, eight of the divided digital data items is placed distant in terms of time, and then two digital data items are multiplexed and transmitted. The two transmitted digital data items are received to select either of the two digital data items which has superior quality. As a result, even if interception or the like takes place on the transfer passage and an error cannot be corrected for a period of the interception, continuous data transfer can be performed on condition that the period, in which the error cannot be corrected, is shorter than the time corresponding to N units. Moreover, the transfer band required by the infrared rays for use in the transfer can be reduced.

Figure 12:
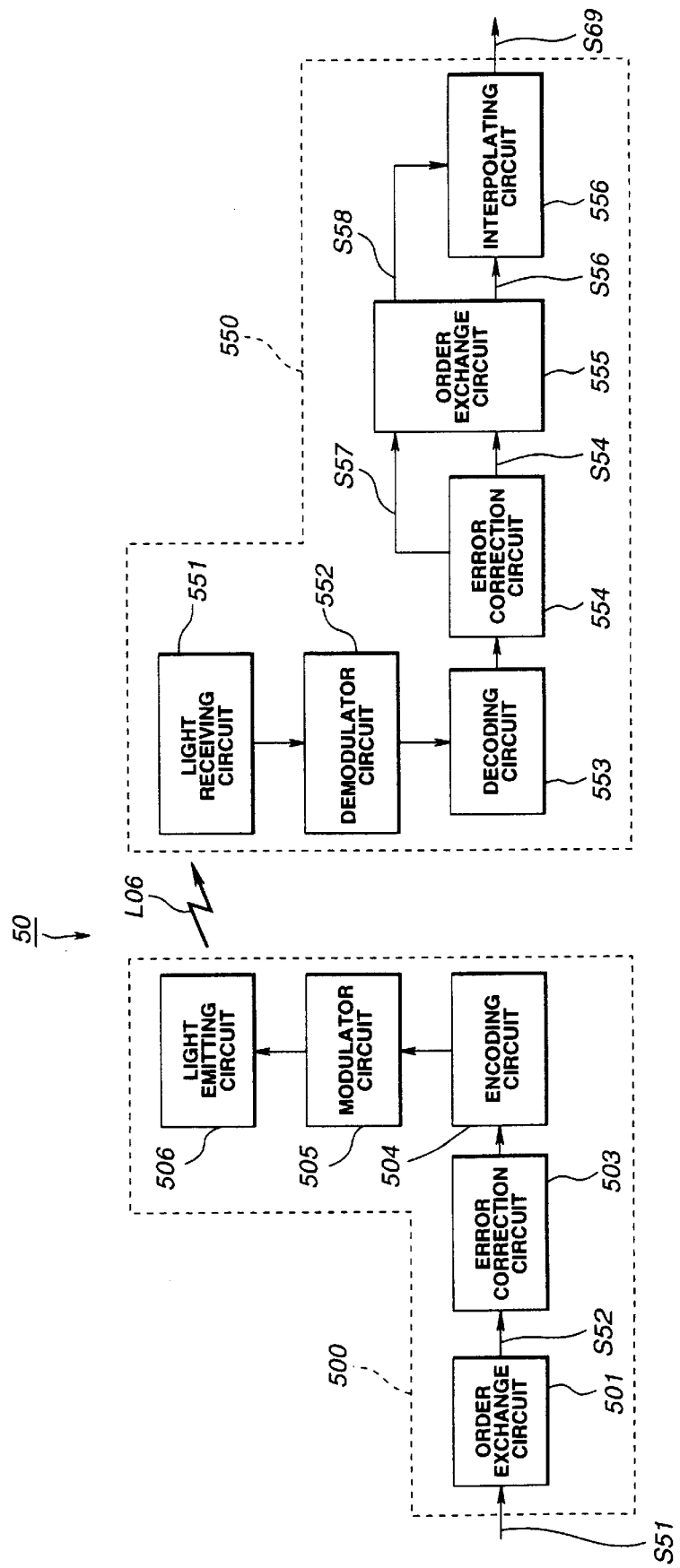
FIG. 12 is a block diagram showing a light-signal transfer system according to a fifth embodiment of the present invention.

A light-signal transfer system according to a fifth embodiment of the present invention will now be described. A light-signal transfer system 50, as shown in FIG. 12, includes a light-signal transmitting apparatus 500 and a light-signal receiving apparatus 550.

The light-signal transmitting apparatus 500 includes an order exchange circuit 501, an error correction circuit 503, a encoding circuit 504, a modulator circuit 505 and a light emitting circuit 506.

Digital data S51 is supplied to the light-signal transmitting apparatus 500. Digital data S51 is a time sequential digital signal, such as a digital audio signal or a digital video signal. Digital data S51 is supplied to the order exchange circuit 501.

The order exchange circuit 501 is a circuit for subjecting supplied digital data S51 to an interleaving process for exchanging the time sequential order of digital data S51 by a predetermined procedure to generate digital data S52. The operation of the order exchange circuit 501 will be described later. Digital data S52 is supplied to the error correction circuit 503.

The error correction circuit 503 divides supplied digital data S52 into a predetermined number of blocks, and then adds an error correction code to each block so as to supply a digital signal to the encoding circuit 504.

The encoding circuit 504 subjects the digital signal, to which the error correction code has been added, to an interleaving process in block units, and then adds a header, synchronizing data and the like to subject the same to an encoding process using an encoding method adaptable to transfer. The digital signal is supplied from the encoding circuit 504 to the modulator circuit 505.

The modulator circuit 505 modulates the digital signal supplied from the encoding circuit 504 by a predetermined modulating method to output a transfer signal adaptable to the optical space transfer.

The light emitting circuit 506 emits infrared ray L06 to a space when the transfer signal supplied from the modulator circuit 505 operates the optical device or the like.

The infrared ray L06 emitted from the light emitting circuit 506 to the space is supplied to the light-signal receiving apparatus 550.

The light-signal receiving apparatus 550 has a light receiving circuit 551, a demodulator circuit 552, a decoding circuit 553, an error correction circuit 554, an order exchange circuit 555 and an interpolating circuit 556.

The light receiving circuit 551 receives the infrared ray L06 and generates a receipt signal having the level which is changed in accordance with change in the quantity of infrared ray L06. As a result, the light receiving circuit 551 receives the transfer signal and corrects the level of the transfer signal by an automatic gain control circuit (not shown) thereof to output the corrected transfer signal to the demodulator circuit 552.

The demodulator circuit 552 reproduces a carrier wave from the transfer signal output from the light receiving circuit 551 to demodulate the digital signal from the carrier wave by a demodulating method corresponding to the modulator circuit 505. The demodulator circuit 552 supplies the demodulated digital signal to the decoding circuit 553.

The decoding circuit 553 detects, from the digital signal, synchronizing data, the header and the like to decode the digital signal by a decoding method corresponding to the encoding circuit 504 relative to a result of the detection. Then, the decoding circuit 553 subjects a result of the decoding operation to a deinterleaving process to supply the digital signal to which the error correction code has been added.

The error correction circuit 554 uses the error correction code of the digital signal to correct an error of the digital signal so as to correct a bit error generated in the spatial transfer performed in a region from the light-signal transmitting apparatus 500 to the light-signal receiving apparatus 550. Thus, the error correction circuit 554 outputs digital data S54 of the digital signal having a quality restored from the state of the quality lost during the transfer. Digital data S54 is a signal corresponding to digital data S52. Moreover, the error correction circuit 554 supplies, to the order exchange circuit 555, an error detection signal S57 indicating whether or not an error has been detected and whether or not the error can be corrected.

The order exchange circuit 555 exchanges the order of digital data S54 to restore the order exchanged by the order exchange circuit 501. The signal, the order of which is exchanged, is supplied to the interpolating circuit 556 as digital data S56. Simultaneously, the order exchange circuit 555 exchanges the order of the error detection signal S57 by a method similar to that with which the order of digital data S54 is exchanged in such a manner that digital data and the detection signal are made to correspond to each other to supply error detection signal S57. Then, the order exchange circuit 555 supplies it as an error detection signal S58 to the interpolating circuit 556. If interception or the like of digital data S54 before its order is exchanged takes place and portions in each of which an error cannot be corrected is generated, the portions, in each of which the error cannot be corrected, are continuous portions. Since digital data S56 is a signal, the order of which has been restored to the original order by the order exchange circuit 555, and which is obtained by exchanging the order of digital data S54, generation of continuous portions, in each of which the error cannot be corrected, can be prevented.

In accordance with information indicated by the error detection signal S58, the interpolating circuit 556 interpolates digital data S56 with a portion of the error detection signal S58 which has no portion of a type in which the error cannot be corrected to output as digital data S59. If digital data S56 has no portion of the type in which the error cannot be corrected, the interpolating circuit 556 delays digital data S56 by the time which is required when the interpolating process must be performed to output it as digital data S59. The interpolating method will be described later.

The order exchange circuit 501 will now be described with reference to FIGS. 13 and 14.

Figure 13:
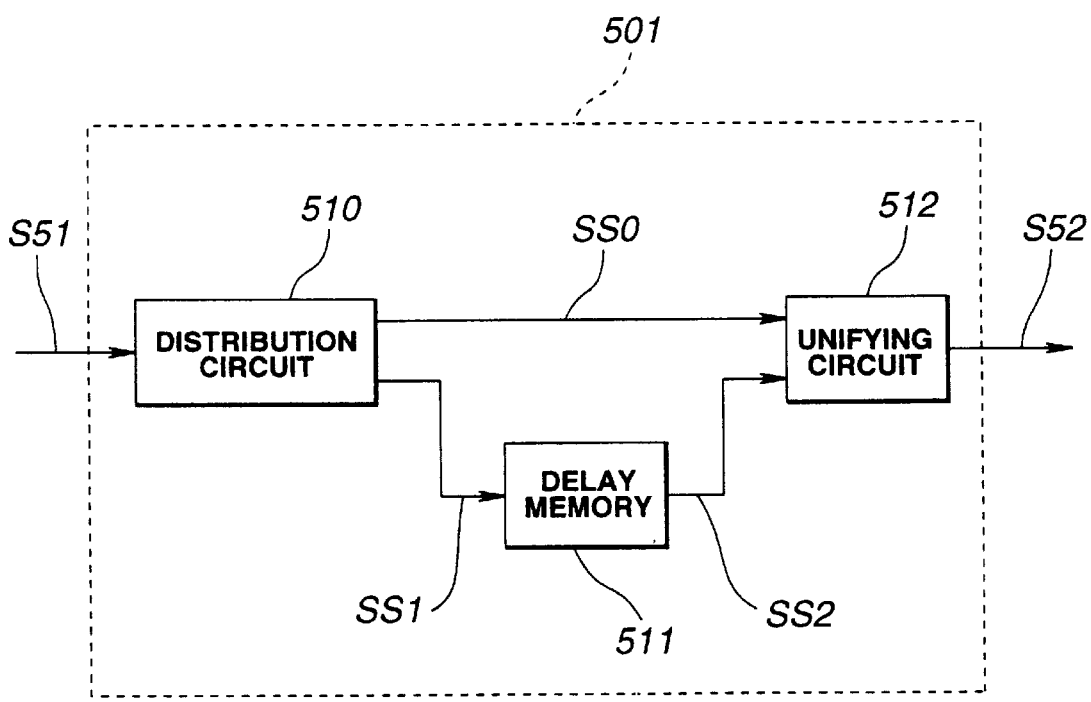
FIG. 13 is a block diagram showing an order exchanging circuit of the light-signal transmitting apparatus.
Figure 14:
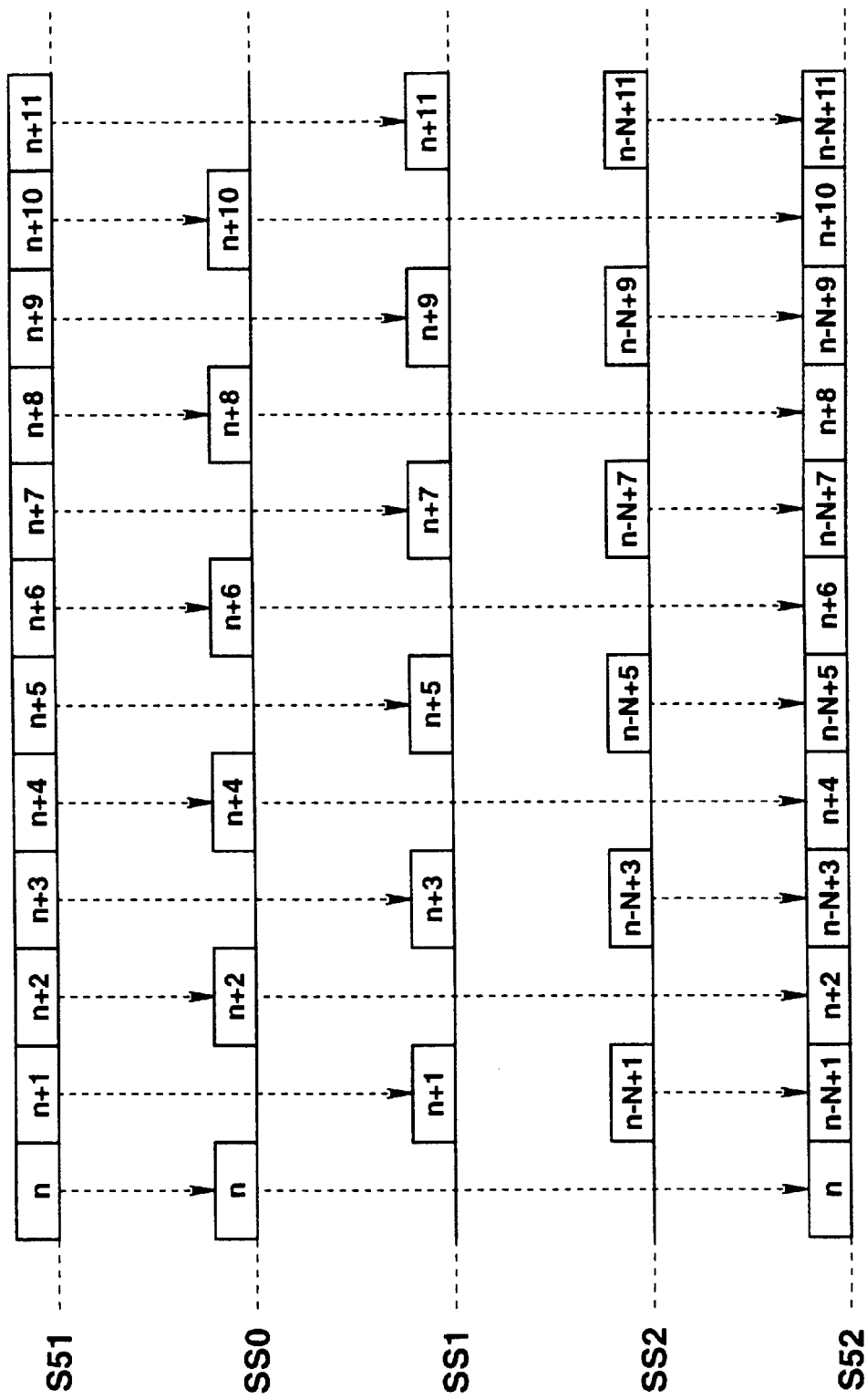
FIG. 14 is a timing chart of the operation of the order exchanging circuit of the light-signal transmitting apparatus.

As shown in FIG. 13, the order exchange circuit 501 has a distribution circuit 510, a delay memory 511 and a unifying circuit 512.

The distribution circuit 510 is supplied with digital data S51 which is supplied to the light-signal transmitting apparatus 500. The distribution circuit 510 distributes S51 in accordance with whether its unit number is an even number or odd number. The distribution circuit 510 distributes digital data having units having even numbers to the unifying circuit 512 as digital data SS0 and distributes digital data having units have odd numbers to the delay memory 511 as digital data SS1. Note that n which is the unit number is an even number.

The delay memory 511 delays supplied digital data SS1 by the time corresponding to N units to supply it as digital data SS2 to the unifying circuit 512.

The unifying circuit 512 unifies digital data SS0 and digital data SS2 to generate and output digital data S52.

The order exchange circuit 555 will now be described with reference to FIGS. 15 and 16.

Figure 15:
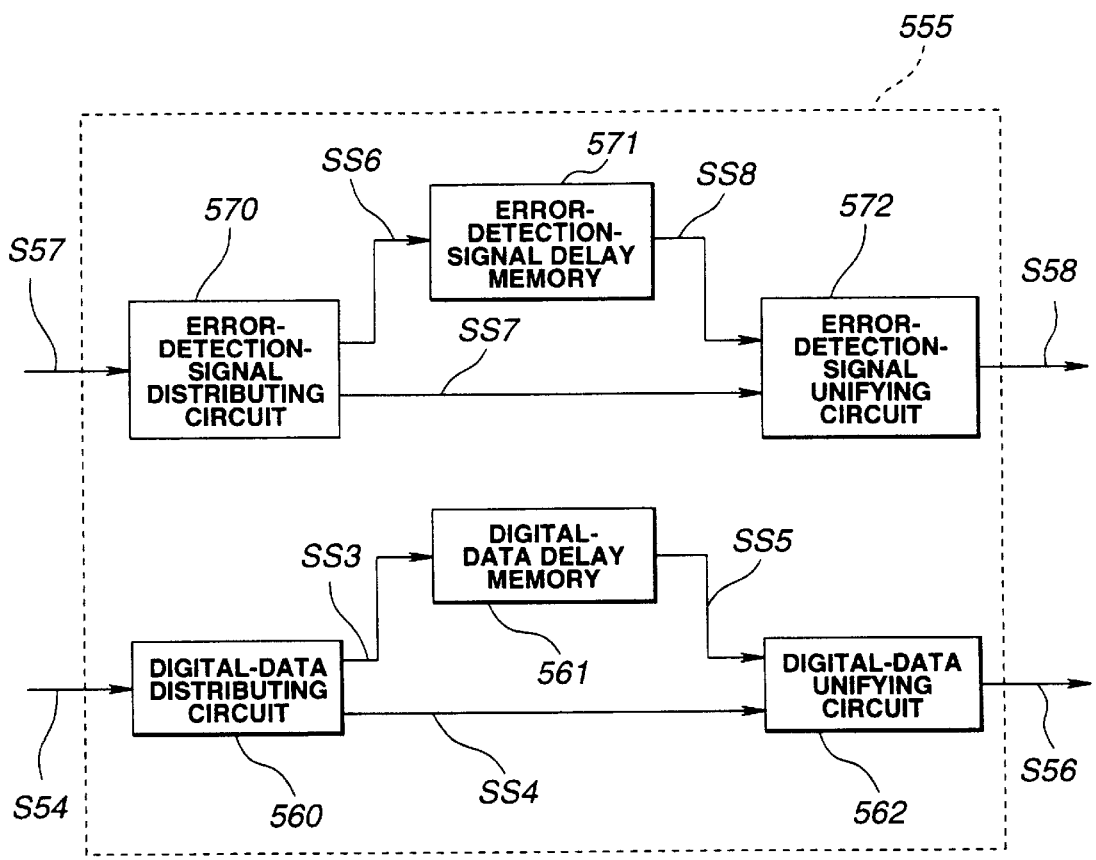
FIG. 15 is a block diagram showing a circuit for again exchanging the order provided for the light-signal receiving apparatus.
Figure 16:
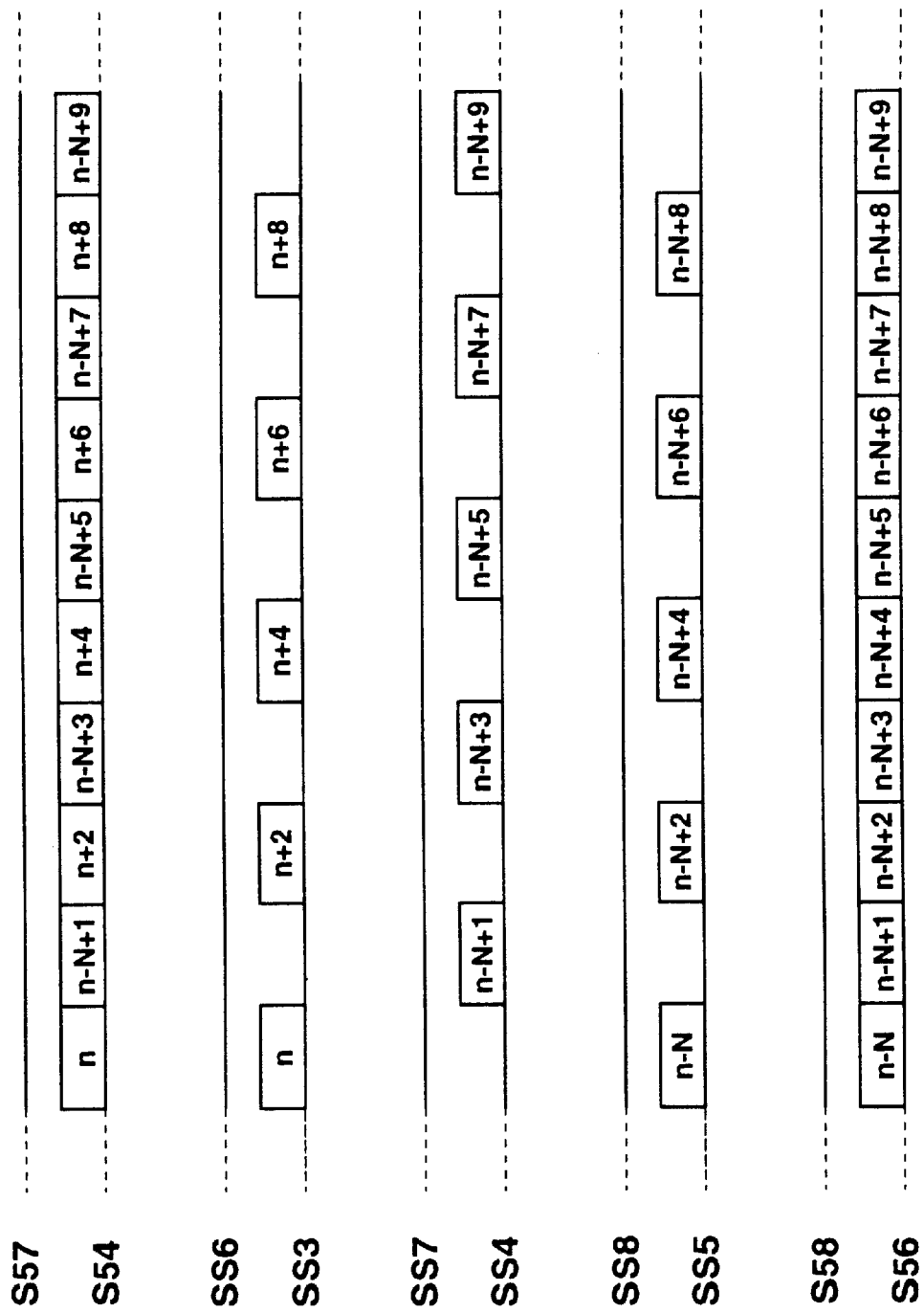
FIG. 16 is a timing chart of the operation of the circuit for again exchanging the order provided for the light-signal receiving apparatus.

The order exchange circuit 555, as shown in FIG. 15, includes a digital-data distributing circuit 560 to which digital data S54 is supplied, a digital-data delay memory 561 and a digital-data unifying circuit 562. The order exchange circuit 555 includes an error-detection-signal distributing circuit 570 to which the error detection signal S57 is supplied, an error-detection-signal delay memory 571 and an error-detection-signal unifying circuit 572.

The digital-data distributing circuit 560 is supplied with digital data S54 which is a signal corresponding to digital data S52 which is output from the order exchange circuit 501. When digital data S54 has been supplied, the digital-data distributing circuit 560 performs an operation reverse to that performed by the unifying circuit 512 to distribute digital data S54 to digital data SS3 and digital data SS4. The digital-data distributing circuit 560 supplies digital data SS3 to the digital-data delay memory 561 and supplies digital data SS4 to the digital-data unifying circuit 562.

The digital-data delay memory 561 delays supplied digital data SS3 by the time corresponding to N units to supply digital data SS5 to the digital-data unifying circuit 562.

The digital-data unifying circuit 562 unifies supplied digital data SS5 and digital data SS4 to generate and output digital data S56.

The error-detection-signal distributing circuit 570 distributes the error detection signal S57 to the digital data SS6 and digital data SS7 by a method similar to the method with which digital data is distributed by the digital-data distributing circuit 560 to maintain the relationship between digital data and error detection signals. The error-detection-signal distributing circuit 570 supplies the digital data SS6 to the error-detection-signal delay memory 571 and supplies the digital data SS7 to the digital-data unifying circuit 562. When the level of each of the digital data SS6 and SS7 is high, existence of a portion in which an error cannot be corrected is indicated. When the signals are low level, no existence of the portion in which the error cannot be corrected, is indicated.

The error-detection-signal delay memory 571 delays supplied digital data SS6 by the time corresponding to N units to output the error detection signal SS8 to the error-detection-signal unifying circuit 572.

The error-detection-signal unifying circuit 572 unifies the supplied error detection signal SS8 and digital data SS7 to generate and output the error detection signal S58.

As a result of the above-mentioned operation, the digital data, the order of which has been exchanged by the order exchange circuit 501, is restored to have the original order by the order exchange circuit 555. Also relationship of the error detection signal with digital data having exchanged order is maintained.

The operation of the interpolating circuit 556 will now be described with reference to FIGS. 17 and 18.

As described above, the interpolating circuit 556 is a circuit for interpolating the portion of digital data S56 in which the error cannot be corrected with a portion having no error in accordance with information indicated by the error detection signal S58 so as to output digital data S59. If digital data S56 has no portion of a type in which the error cannot be corrected, the interpolating circuit 556 delays digital data S56 by the time which is required when an interpolating process must be performed to output digital data S59. The case where the error correction cannot be performed is, for example, a case where the infrared ray L06 is temporarily intercepted by a moving human being or the like.

When the level of the error detection signal S57 is low, no existence of a portion in which the error cannot be corrected is indicated. Therefore, the interpolating circuit 556 delays digital data S56 by the time which is required when the interpolating process must be performed to output it as digital data S59.

Figure 17:
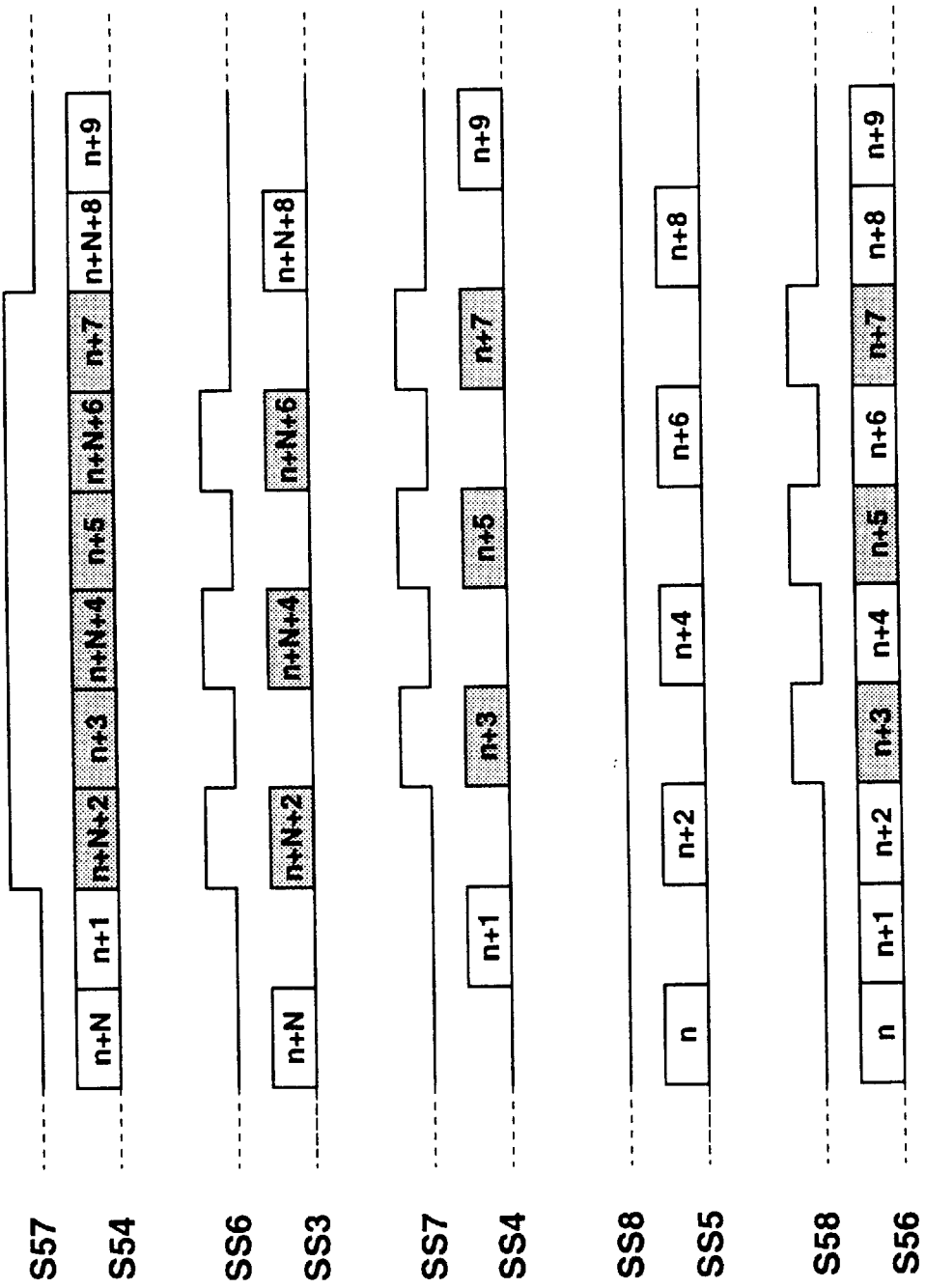
FIG. 17 is a timing chart of the operation of an interpolating circuit of the light-signal receiving apparatus.

If the level of the error detection signal S57 is high for a predetermined period as shown in FIG. 17, existence of the portion in which the error cannot be corrected is indicated. FIG. 17 shows a state where time corresponding to N units has elapsed and the level is made to be high for the time corresponding to six units. Units of digital data having diagonal lines indicate units in which error correction cannot be performed.

Since digital data SS5 is the same as digital data SS3 preceding by N units, digital data SS5 has no portion in which error correction cannot be performed. Therefore, the operation of the order exchange circuit 555 causes digital data S56 to be formed in such a manner that units, in which error correction cannot be performed, and units, in such a way that error correction can be performed, are alternately aligned. The error detection signal S58 is at the high level in the units of digital data S56 in which the error correction cannot be performed.

The interpolating circuit 556 interpolates digital data S56 in the regions, in each of which the error detection signal S58 is at the high level, with units in which the error correction can be performed to output digital data S59. The method of interpolation which is performed by the interpolating circuit 556 will now be described.

A first method is called a previous-value retention or a zero-order interpolation in which the unit in which the error correction cannot be performed is replaced by the value of the unit immediately preceding the foregoing unit. That is, the values of unit numbers n+3, n+5 and n+7 of digital data S56 shown in FIG. 15 are replaced by the values of unit numbers n+2, n+4 and n+6.

A second method is called an average-value interpolation or a primary interpolation with which the unit in which the error correction cannot be performed is replaced by an average value of units across the foregoing unit. That is, the value of the unit number n+3 of digital data S56 shown in FIG. 17 is replaced by the average value of unit numbers n+2 and n+4, the value of the unit number n+5 is replaced by the average value of the unit numbers n+4 and n+6 and the value of the unit number n+7 is replaced by the average value of the unit numbers n+6 and n+8.

Digital data S59 interpolated by either of the above-mentioned methods is used as the final output.

As described above, the interpolating circuit 556 enables discontinuous portions occurring due to interception or the like to be covered by using correlation if portions of digital data adjacent in terms of time have the correlation. Therefore, the foregoing method may be applied in a case of audio signals, video signals or the like which are signals adjacent in terms of time.

Figure 18:
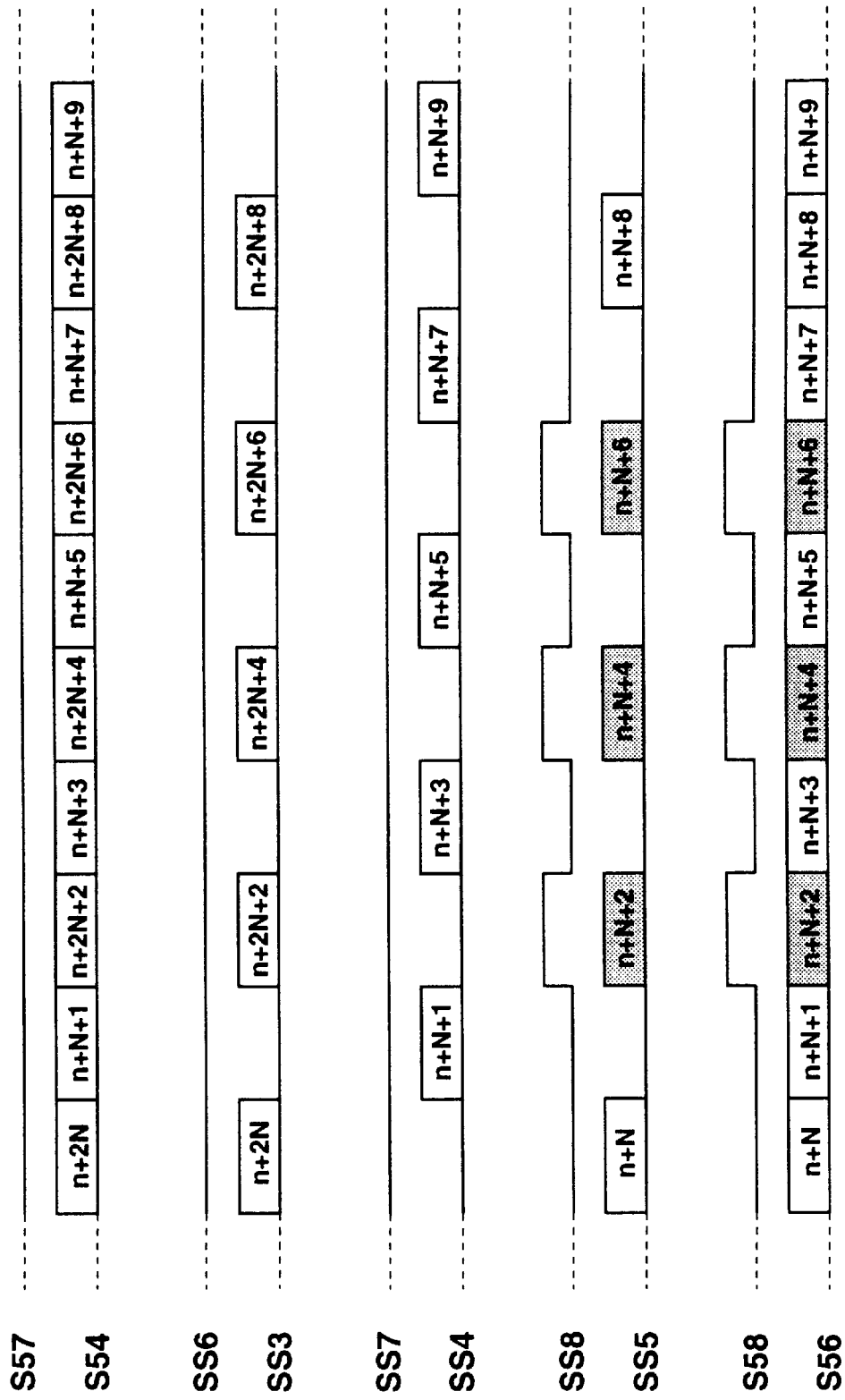
FIG. 18 is a timing chart of the operation of the interpolating circuit of the light-signal receiving apparatus.

Referring to FIG. 18, states of signals after time corresponding to N units has elapsed from the state shown in FIG. 17 will now be described. In this state, the error detection signal S57 is always at the low level and no portion exists in which the error correction cannot be performed.

Digital data SS5 is a signal of digital data SS3 preceding by N units. Therefore, digital data SS5 is the same signal as digital data SS3 shown in FIG. 17 and portions in each of which error correction cannot be performed exist. Thus, digital data S56 is formed by the operation of the order exchange circuit 555 in such a manner that units, in each of which the error correction cannot be performed, and units, in each of which the error correction can be performed, are alternately aligned. The error detection signal S58 is at the high level in the units of digital data S56 in each of which error correction cannot be performed.

If portions in each of which the error correction cannot be performed are generated as shown in FIG. 17, portions in each of which the error correction cannot be performed therefore are generated even after the time corresponding to N units has elapsed. Therefore, interpolations of the foregoing units are performed by the interpolating circuit 556 so that interpolated digital data S59 is output.

The size of the unit, which is different depending upon the type of the signal, is made in such a manner that one frame forms one unit in a case of a digital video signal and one sample forms one unit in a case of a digital audio signal.

In a case of 2-channel digital audio signal in which the right-hand channel and the left-hand channel usually have correlation, the right-hand channel and the left-hand channel may be used in place of the even-numbered samples and odd-numbered samples in the time sequence.

Although the simplest exchanging method has been described, any method of converting so-called burst errors occurring continuously into discontinuous random errors may, of course, be employed.

As described above, the light-signal transfer system according to the fifth embodiment of the present invention is able to reproduce continuous data because of the interpolation process if interception or the like takes place on the transfer passage and the error correction cannot be performed in the period of the interception on condition that the period in which the error correction cannot be performed is shorter than the period corresponding to N units. Moreover, the light-signal transfer system according to the fifth embodiment of the present invention realizes an advantage that the transfer band required by the infrared rays for use in the transfer can be made to be the same as the conventional transfer band.

The light-signal transmitting apparatus according to the present invention is structured to divide a supplied signal into the two same signals and delay either of the signals in terms of time. Moreover, the two signals are converted into light signals, and then light signals are transmitted. As a result, the light-signal transmitting apparatus according to the present invention is able to continue signal transfer even if the transfer passage is intercepted.

The light-signal transmitting apparatus according to the present invention is arranged to temporarily store data reproduced from a recording medium on a storage means. The light-signal transmitting apparatus multiplexes data read from the storage means by a usual manner and data read previously in terms of time to convert the multiplexed signal into a light signal and output the light signal. Thus, the light-signal transmitting apparatus according to the present invention is able to continue signal transfer even if the transfer passage is intercepted. Moreover, signals reproduced from a recording medium can be transmitted in a real time manner.

The light-signal receiving apparatus according to the present invention is arranged in such a manner that a supplied signal is divided into two same signals, after which either of the two signals is delayed and the two signals are converted into light signals, and then the transmitted signals are received to select a signal having superior quality. Therefore, the light-signal receiving apparatus according to the present invention is able to receive signals without interruption even if the transfer passage is intercepted.

The light-signal transmitting apparatus according to the present invention is structured in such a manner that a supplied signal is divided into two same signals, either of the two signals is delayed, the two signals are converted into light signals and the light signals are transmitted, the light-signal receiving apparatus receive the light signals to select either of the signals having superior quality. As a result, the light-signal receiving apparatus according to the present invention is able to transmit signals without interruption of the signal transfer even if the transfer passage is intercepted.

The light-signal transmitting apparatus according to the present invention is structured in such a manner that the light-signal transmitting apparatus subjects supplied time-sequential signals into the interleaving process to convert the signals into light signals to transmit the light signals. The light-signal receiving apparatus receives the light signals to subject the received signals to the deinterleaving process to subject a signal having superior quality to an interpolation process. Therefore, the light-signal transmitting apparatus according to the present invention is able to transmit signals without interruption even if the transfer passage is intercepted. Moreover, the transfer band can be made to be the same as that of the conventional structure.

The light-signal transmitting method according to the present invention has the steps of dividing a supplied signal into two same signals, delaying either of the two signals, converting the two signals into light signals, transmitting the light signals, receiving the transmitted light signals and selecting either of the two signals having superior quality. As a result, the light-signal transmitting method according to the present invention is able to transmit signals without interruption even if the transfer passage is intercepted.

The light-signal transmitting method according to the present invention has the steps of subjecting time-sequential signals into the interleaving process, converting the signals into light signals, transmitting the light signals, receiving the light signals, subjecting the received signals into the interleaving process and subjecting data having inferior quality to the interpolating process. As a result, the light-signal transmitting method according to the present invention is able to transmit signals without interruption of the signal transfer even if the transfer passage is intercepted. Moreover, the transfer band can be made to be the same as that of the conventional structure.

What I claim:

1. A light-signal transmitting apparatus comprising:
   reproducing means for reproducing data recorded on a recording medium;
   storage means for temporarily storing data reproduced by said reproducing means;
   write control means for controlling said reproducing means to administrate data stored on said storage means;
   a first reading portion for reading data stored on said storage means;
   a second reading portion for reading, from data read from said first reading portion, data stored on said storage means preceding to data read from said first reading portion;
   read control means for generating a transfer signal obtained by multiplexing two data items read from said first reading portion and said second reading portion; and
   transmitting means for converting the transfer signal into a light signal and emitting the light signal to the space.

2. A light-signal transmitting apparatus according to claim 1, wherein
   said reproducing means reproduces data stored on said storage means at a rate higher than a rate at which said first reading portion of said read control means reads data, and
   said write control means performs control in such a manner that a reproducing operation of said reproducing means is temporarily interrupted when data stored in said storage means is larger than a predetermined quantity of data.

* * * * *